(12) United States Patent
Crowther et al.

(10) Patent No.: US 9,434,795 B2
(45) Date of Patent: Sep. 6, 2016

(54) PRODUCTION OF VINYL TERMINATED POLYETHYLENE USING SUPPORTED CATALYST SYSTEM

(71) Applicant: ExxonMobil Chemical Patents Inc., Baytown, TX (US)

(72) Inventors: Donna J. Crowther, Seabrook, TX (US); Patrick Brant, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 375 days.

(21) Appl. No.: 14/033,636

(22) Filed: Sep. 23, 2013

(65) Prior Publication Data
US 2014/0088265 A1    Mar. 27, 2014

Related U.S. Application Data

(60) Provisional application No. 61/704,606, filed on Sep. 24, 2012.

(51) Int. Cl.
| | |
|---|---|
| *C08F 4/76* | (2006.01) |
| *C08F 4/52* | (2006.01) |
| *C08F 8/00* | (2006.01) |
| *C08F 10/02* | (2006.01) |

(52) U.S. Cl.
CPC . *C08F 4/76* (2013.01); *C08F 4/52* (2013.01); *C08F 8/00* (2013.01); *C08F 10/02* (2013.01)

(58) Field of Classification Search
CPC .............. C08F 4/52; C08F 4/76; C08F 8/00
USPC ................. 525/333.7; 502/113, 117; 526/127
See application file for complete search history.

(56) References Cited

U.S. PATENT DOCUMENTS

| | | | |
|---|---|---|---|
| 4,110,377 A | 8/1978 | Clerici et al. | |
| 5,493,041 A | 2/1996 | Biggs et al. | |
| 5,770,664 A | 6/1998 | Okumura et al. | |
| 6,084,030 A | 7/2000 | Janssen et al. | |
| 6,111,027 A | 8/2000 | Wright et al. | |
| 6,114,445 A | 9/2000 | Tzoganakis et al. | |
| 6,169,154 B1 | 1/2001 | Machida et al. | |
| 6,417,130 B1 * | 7/2002 | Mink .................. | C08F 10/00 502/113 |
| 7,247,385 B1 | 7/2007 | Tzoganakis et al. | |
| 7,943,719 B2 | 5/2011 | Hawker et al. | |
| 8,283,419 B2 | 10/2012 | Hagadorn et al. | |
| 8,372,930 B2 | 2/2013 | Brant et al. | |
| 8,399,725 B2 | 3/2013 | Brant et al. | |
| 8,501,894 B2 | 8/2013 | Crowther et al. | |
| 2002/0077431 A1 | 6/2002 | Whiteker | |
| 2005/0032992 A1 | 2/2005 | Floyd et al. | |
| 2010/0168309 A1 | 7/2010 | Mackinnon et al. | |
| 2010/0331505 A1 | 12/2010 | Masino et al. | |
| 2012/0029099 A1 | 2/2012 | Hsieh et al. | |
| 2012/0101235 A1 | 4/2012 | Crowther et al. | |
| 2012/0108765 A1 | 5/2012 | Yang et al. | |
| 2012/0200010 A1 | 8/2012 | Crowther et al. | |
| 2012/0245293 A1 | 9/2012 | Crowther et al. | |
| 2012/0245311 A1 | 9/2012 | Crowther et al. | |
| 2012/0245313 A1 | 9/2012 | Crowther et al. | |

FOREIGN PATENT DOCUMENTS

| | | | |
|---|---|---|---|
| EP | 0 530 408 | 3/1993 | |
| EP | 0 802 216 | 10/1997 | |
| EP | 1 002 809 | 5/2000 | |
| JP | 10-087717 | 4/1998 | |
| JP | 2007/169340 | 7/2007 | |
| JP | 2007/246433 | 9/2007 | |
| JP | 2008/050278 | 3/2008 | |
| JP | 20080502778 | * 6/2008 | ............... C07F 7/00 |
| JP | 2012/116871 | 6/2012 | |
| WO | WO 91/09882 | 7/1991 | |
| WO | WO 98/33842 | 8/1998 | |
| WO | WO 01/40324 | 6/2001 | |
| WO | 2006/025949 | 3/2006 | |
| WO | WO 2009/155472 | 12/2009 | |

OTHER PUBLICATIONS

U.S. Appl. No. 61/704,604, Sep. 24, 2012, Crowther et al.
U.S. Appl. No. 61/704,611, Sep. 24, 2012, Kulkami et al.
Amin et al., "Versatile Pathways for In Situ Polyolefin Functionalization with Heteroatoms: Catalytic Chain Transfer", Angewandte Chemie International Edition, 2008, 47, pp. 2006-2025.
Bochmann, Manfred, "The Chemistry of Catalyst Activation: The Case of Group 4 Polymerization Catalysts", Organometallics, 2010, vol. 29, No. 21, pp. 4711-4740.
Eritovsek et al., "Iron and Cobalt Ethylene Polymerization Catalysts Bearing 2,6-Bis(Imino)Pyridyl Ligands: Synthesis, Structures, and Polymerization Studies", Journal of the American Chemical Society, 1999, 121, pp. 8728-8740.
Busico et al., "$^1$H NMR Analysis of Chain Unsaturations in Ethene/1-Octene Copolymers Prepared with Metalloceac Catalysts and High Temperature", Macromolecules, 2005, vol. 38, No. 16, pp. 6988-06996.
Busico et al., "Hafnocenes and MAO: Beware of Trimethylaluminuml" Macromolecules, 2009, vol. 42, No. 6, pp. 1789-1791.
Cancouet et al., "Functional Polysiloxanes. II. Neighboring Effect in the Hydrosilylation of Poly(hydrogerimethylsilexane-co-dimethylsiloxane)s by Allylglycidylether", Journal of Polymer Science Part A: Polymer Chemistry, 2000, vol. 38, No. 5, pp. 837-845.
Chung, T. C., "Synthesis of Functional Polyolefin Copolymers with Graft and Block Structures", Progress in Polymer Science, 2002, vol. 27, pp. 39-85.
Clerici et at, "Catalytic C-Alkylation of Secondary Amines with Alkenes", Synthesis, 1980, vol. 4, pp. 305-306.

(Continued)

*Primary Examiner* — Ling Choi
*Assistant Examiner* — Chun-Cheng Wang
(74) *Attorney, Agent, or Firm* — Catherine L. Bell; Kevin M. Faulkner

(57) ABSTRACT

This invention relates to processes to produce vinyl terminated polyethylene involving contacting ethylene with a supported metallocene catalyst system; wherein the supported catalyst system comprises a support material; an alumoxane activator; and a metallocene compound. A supported metallocene catalyst system is also disclosed. Processes to produce ethylene copolymers are also disclosed.

26 Claims, 1 Drawing Sheet

(56) References Cited

OTHER PUBLICATIONS

Eisenberger et al., "Tantalum-Amidate Complexes for the Hydroaminoalkylation of Secondary Amines: Enhanced Substrate Scope and Enantioselective Chiral Amine Synthesis", Angewandte Chemie International Edition, 2009, 48, pp. 8361-8365.

Herzon et al., "Hydroarninoalkylation of Unactivated Olefins with Dialkylamines", Journal of the American Chemical Society, 2008, vol. 130, No. 45, pp. 14940-14941.

Herzon et al, "Direct, Catalytic Hydroaminoalkylation of Unactivated Olefins with N-Alkyl Arylamines", Journal of the American Chemical Society, 2007, vol. 129, No. 21, pp. 6690-6691.

Huang et al., "The Bridged Cyclopentadienyl Indenyl (fluorenyl) Zirconocene Complexes for Polyethylene Macromonomers", Applied Organometallic Chemistry, 2010, vol. 24, pp. 727-733.

Imanishi et al., "Recent Developments in Olefin Polymerizations with Transition Metal Catalysts", Progress in Polymer Science, 2001, vol. 26, No. 8, pp. 1147-1198.

Kubiak et al., "Titanium-Catalyzed Hydroaminoalkylation of Alkenes by C—H Bond Activation at $sp^3$ Centers in the αPosition to a Nitrogen Atom", Angewandte Chemie International Edition, 2009, vol. 48, No. 6, pp. 1153-1156.

Lehmus et al., "Chain End Isomerization as a Side Reaction in Metallocene-Catalyzed Ethylene and Propylene Polymerizations", Macromolecules, 2000, vol. 33, No. 23, pp. 8534-8540.

Lopez et al.,"Synthesis of Well-Defined Polymer Architectures by Successive Catalytic Olefin Polymerization and Living/Controlled Polymerization Reactions", Progress in Polymer Science, 2007, vol. 32, No. 4, pp. 419-454.

Mazzolini et al, "Polyethylene End Functionalization Using Radical-Medicated Thiol-ene Chemistry: Use of Polyethylenes Containing Alkene End Functionality", Macromolecules 2011, vol. 44 No. 9, pp. 3381-3387.

Moad, G., Corrigendum to "The Synthesis of Polyolefin Graft Copolymers by Reactive Extrusion", Progress in Polymer Science, 1999, vol. 24, No. 1, pp. 88-142.

Naga et al., "Effect of Co-Catalyst System on α-olefin Polymerization with Rac- and Meso-[dimethylsilylenebis(2,3,5-trimethyl-cyclopentadienyl)] zirconium dichloride", Macromol. Rapid Commun., vol. 18, 1997, pp. 581-589.

Roesky Peter W., "Catalytic Hydroaminoalkylation", Angewandte Chemie International Edition, 2009, vol. 48, pp. 4892-4894.

Seayed el al., "Hydroaminomethylation of Olefins Using a Rhodium Carbene Catalyst", Tetrahedron Letters, 2003, vol. 44, No. 8, pp. 1679-1683.

Segawa Yastitorno, "Catalytic Hydroaminoalkylation of Alkenes", Yuki Gosei Kagaku Kyokaishi (Journal of Synthetic Organic Chemistry), 2009, vol. 67, No. 8, pp. 843-844. (English Abstract).

Suzuki et al, "Behavior of Metallocene Olefin Polymerization Catalysts Under High Pressure", Macromolecules 2000, 33(12), pp. 4602-4606.

Turunen et al., "Suppression of Metallocene Catalyst Leaching by the Removal of Free Trimethylaluminium From Methylaluminoxane", Journal of Applied Polymer Science, vol. 100, 2006, pp. 4632-4635.

Yano et al., "Homo- and Copolymerization of Ethylene by Cationic Hafnocene Catalysts Based on Tetrakis(pentafluorophenyl)borate", Macromolecular Chemistry and Physics, 1999, vol. 200, No. 4, pp. 924-932.

Imhoff, Donald W. et al., "*Characterization of Methylaluminoxanes and Determination of Trimethylaluminum Using Proton NMR*," Organometallics, 1998, vol. 17, p. 1941-1945.

* cited by examiner

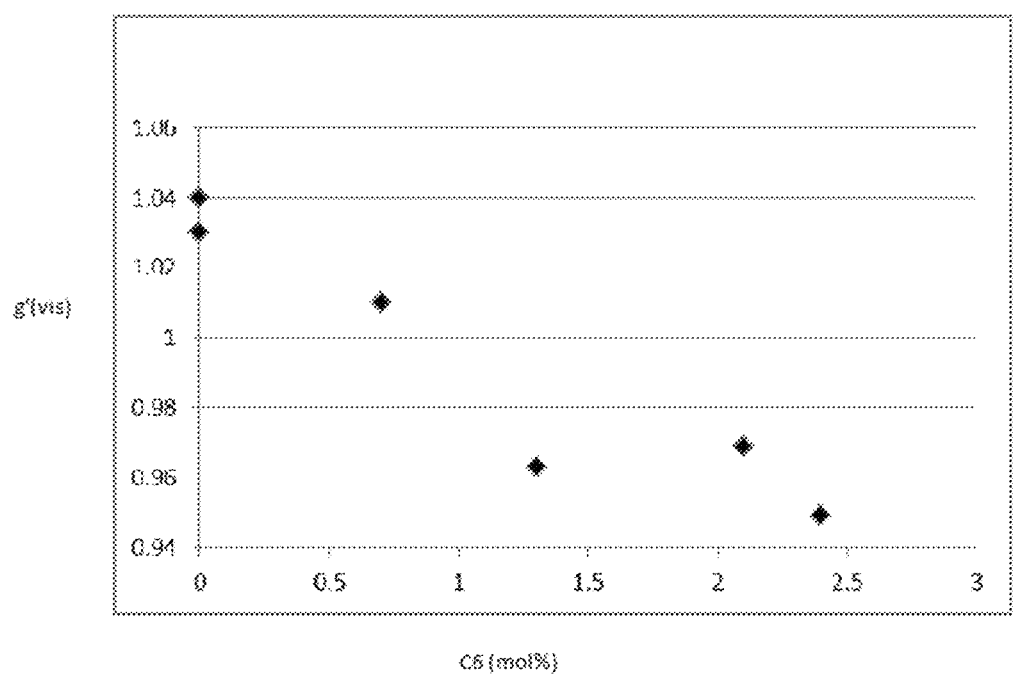

PRODUCTION OF VINYL TERMINATED POLYETHYLENE USING SUPPORTED CATALYST SYSTEM

CROSS REFERENCE TO PRIORITY APPLICATION

This application claims priority to and the benefit of U.S. Provisional Application No. 61/704,606, filed Sep. 24, 2012, the disclosure of which is incorporated herein by reference in its entirety.

STATEMENT OF RELATED CASES

This application relates to U.S. Provisional Application Ser. No. 61/704,604, filed on Sep. 24, 2012; and U.S. Provisional Application Ser. No. 61/704,611, filed on Sep. 24, 2012.

FIELD OF THE INVENTION

This invention relates to heterogeneous processes to produce vinyl terminated polyethylene, particularly vinyl terminated ethylene homopolymers and vinyl terminated ethylene copolymers.

BACKGROUND OF THE INVENTION

Polyolefins are the largest-volume family of commercially important, high tonnage thermoplastics and are produced by a worldwide industry with impressive capacity. Even more impressive is the wide range of polymer types and grades that have been obtained from simple starting materials, such as ethylene and propylene. Polyethylene has the world's largest market share among the polyolefins.

Modification of polyethylene is particularly attractive, because it may allow enhancement of existing polyethylene properties and may even confer new properties that may extend application potential. Polyethylene may have a reactive moiety, for example, a vinyl or vinylidene group, that may allow the polyethylene to be functionalized or to be used as macromonomers, allowing them to become further incorporated into another polymer chain. Vinyl groups tend to be more reactive than the more sterically crowded vinylidene groups. Vinyl terminated polyethylenes are therefore desirable. Additionally, polyethylenes that have about one vinyl end group per polymer molecule are even more desirable. If every polyethylene has a reactive moiety capable of being functionalized or otherwise modified, then there would be appreciable cost savings and efficiency in using such a polyethylene. Accordingly, there is a need for vinyl terminated polyethylene, particularly vinyl terminated polyethylene having about one vinyl group per polyethylene molecule.

U.S. Pat. No. 6,169,154 discloses a branched ethylenic macromonomer, derivable from ethylene singly or derivable from ethylene and another olefin, where (a) the molar ratio of a terminal methyl group/a vinyl group is in the range of from 1 to 100, the macromonomer having a branch other than the branch directly derived from the other olefin; (b) a ratio of vinyl groups to the total unsaturated groups in the macromonomer being 70 mol % or more; and (c) a weight average molecular weight of the macromonomer in terms of a polyethylene measured by a GPC being in the range of 100 to 20,000.

Huang et al. (Appl. Organometal. Chem. 2010, 24, 727-733) disclose the synthesis of long-chain branched polyethylene including the generation of vinyl-terminated polyethylene macromonomers, using bridged cyclopentadienyl indenyl(fluorenyl)zirconocenes. The vinyl-terminated polyethylene macromonomers were reported to have a Mn(NMR) in the range of 3300 to 10,300 g/mol and terminal vinyl percentages of 80.7% to 94.9%.

JP 2012/116871 discloses catalysts for the polymerization of olefins and the manufacture of olefin polymers with good particle shape. These catalysts comprise (a) solid aluminoxanes; (b) organometallic compounds of (b-1) $AlR^5{}_3$ or (b-2) $M^3R^5{}_2$ ($R^5$=H, halo, $C_{1-20}$ hydrocarbyl or alkoxy, $C_{6-20}$ aryloxy, $M^3$=Mg, Zn); and (c) metallocenes of Group 4 metals. Olefin polymers were manufactured by the polymerization of ethylene and comonomers using the catalysts. The catalysts were reported to be useful for the manufacture of vinyl-terminated macromers. Thus, ethylene was polymerized in the presence of aluminoxane, dimethylsilylenebis(cyclopentadienyl)zirconium dichloride, and triisobutylaluminum to give polyethylene reported to have a Mn of 11,500 g/mol, molecular weight distribution of 2.4, and a selectivity of terminal vinyl groups of 0.59.

JP 2008/050278 discloses silylene(cyclopentadienyl)(indenyl)transition metal (Ti, Zr, and Hf) compounds, olefin polymerization catalysts containing them, and the manufacture of polyolefins. Polyolefins having vinyl end groups, useful as macromonomers, were manufactured with these catalysts. In particular, ethylene was polymerized with dimethylsilylene(cyclopentadienyl)(2,4,7-trimethylindenyl)zirconium dichloride, N,N-dimethyloctadecylamine HCl salt-treated hectorite, $Et_3Al$, and $(iso-Bu)_3Al$ to give polyethylene reported to have vinyl end groups of 0.07/1000 C atoms.

JP 2007/246433 discloses metallocenes with long hydrocarbyl-containing bridging groups, olefin polymerization catalysts containing them, and manufacture of vinyl-terminated polyolefins. The metallocenes have the structure I, below:

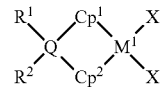

[$M^1$=Ti, Zr, Hf; X=H, halo, $C_{1-20}$ hydrocarbyl, etc.; $Cp^1$, $Cp^2$=(substituted) cyclopentadienyl, (substituted) benzocyclopentadienyl, (substituted) dibenzocyclopentadienyl; substituent for $Cp^1$ and $Cp^2$=halo, $C_{1-20}$ hydrocarbyl, $C_{1-20}$ alkoxy, etc.; $R^1$=$C_{1-40}$ hydrocarbyl; $R^2$=$C_{21-40}$ hydrocarbyl; Q=C, Si, Ge, Sn]. Ethylene was polymerized with I ($R^1$=Me, $R^2$=docosyl, Q=Si, $Cp^1$=$Cp^2$=cyclopentadienyl, $M^1$=Zr, X=Cl), N,N-dimethyloctadecylamine HCl salt-modified hectorite, and $(iso-Pr)_3Al$ to give polyethylene reported to have a number of vinyl end groups of 0.42/1000 C atoms.

JP 2007/169340 discloses ethylene polymerization in the presence of a catalyst containing (propane-1,3-diyl-biscyclopentadienyl)zirconium dichloride, $(iso-Bu)_3Al$, and N,N-dimethyloctadecylamine hydrochloride-modified hectorite to give polyethylene reported to have a number of vinyl end groups of 0.05/1000 C atoms.

EP 0 530 408 discloses vinyl-terminated olefin polymers, reported to have an Mn of 300 to 500,000, manufactured by polymerization of $C_{2-3}$ alkenes in the presence of a reaction product of a polymerization catalyst consisting of a V chelate compound and a dialkylaluminum halide with $CH_2$:CH($C_mH_{2m}$)CH:$CH_2$ (I, m=1-15), and then reacting with I and a proton donor. Polyethylene, reported to have an Mn of 300 to 300,000 and terminal groups $COX[X=OH, OR_1$, halogen, $SO_3R_2$; $R_1=C1_{-5}$ alkyl; $R_2=$(un)substituted $C_{1-20}$ hydrocarbyl], is obtained by polymerization of $C_2H_4$ in the presence of a dilithio compound amine complex, followed by a reaction with $CO_2$, and a proton donor or sulfonyl halide. Thus, vinyl-terminated ethylene polymer was prepared by polymerization of $C_2H_4$ in the presence of $Et_2AlCl$ (where Et means ethyl), tris(2-methyl-1,3-butanedionato) vanadium, and 1,7-octadiene; for structure proof it was refluxed with a solution of diborane in THF and $Bu_2O$, and treated with aqueous NaOH containing $H_2O_2$. The OH-terminated polymer was then treated with $Me_3SiCl$ in pyridine to give trimethylsiloxy group-terminated polyethylene.

Britovsek et al. (J. Am. Chem. Soc. 1999, 121, 8728-8740) discloses the synthesis, characterization, and ethylene polymerization behavior of a series of iron and cobalt halide complexes, LMXn (M=Fe, X=Cl, n=2, 3, X=Br, n=2, M=Co, X=Cl, n=2) bearing chelating 2,6-bis(imino)pyridyl ligands L [L=2,6-(ArNCR$^1$)$_2$C$_5$H$_3$N]. X-ray diffraction studies showed the geometry at the metal centers to be either distorted square pyramidal or distorted trigonal bipyramidal. Treatment of the complexes LMX$_1$, with methylaluminoxane (MAO) led to highly active ethylene polymerization catalysts converting ethylene to highly linear polyethylene (PE). LFeX$_2$ precatalysts with ketimine ligands (R$^1$=Me) are approximately an order of magnitude more active than precatalysts with aldimine ligands (R$^1$=H). Catalyst productivities in the range 3,750 to 20,600 g/mmol·h·bar were observed for Fe-based ketimine catalysts, while Co ketimine systems displayed activities of 450 to 1740 g/mmol·h·bar. Molecular weights (M$_w$) of the polymers produced were in the range 14,000 to 611,000. Changing reaction conditions also affected productivity and molecular weight; in some systems, a bimodal molecular weight distribution was observed.

However, few processes have been shown to produce a high percentage of vinyl chain ends, in high yields, with a wide range of molecular weight, and with high catalyst activity for ethylene-based polymerizations, especially ethylene-based polymerizations catalyzed by a supported catalyst system. Accordingly, there is a need for new processes using supported catalyst systems that produce polyethylene polymers having a high percentage of vinyl chain ends, in high yields, with a wide range of molecular weight, with a narrow molecular weight distribution, and with high catalyst activity. Further, there is a need for ethylene-based reactive materials having vinyl chain ends which can be functionalized and used in other applications.

SUMMARY OF THE INVENTION

The invention relates to a process to produce polyethylene comprising:
(a) contacting ethylene with a supported metallocene catalyst system;

wherein the supported catalyst system comprises:
(i) a support material;
(ii) an alumoxane activator having from about 1 wt % to about 14 wt % trimethylaluminum, based on the weight of the alumoxane activator;
(iii) a metallocene compound represented by the formula:

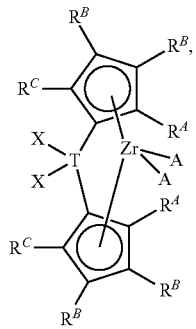

wherein:
T is Si or Ge;
each $R^A$ is a $C_1$ to $C_{20}$ substituted or unsubstituted hydrocarbyl group;
each $R^B$ is, independently, H, or a $C_1$ to $C_8$ substituted or unsubstituted hydrocarbyl group, or a group represented by the formula —$CH_2R^x$;
wherein $R^x$ is a $C_1$ to $C_{20}$ substituted or unsubstituted hydrocarbyl group, provided that at least one $R^B$ is methyl or a group represented by the formula —$CH_2R^x$;
each $R^C$ is, independently, H or a $C_1$ to $C_{20}$ substituted or unsubstituted hydrocarbyl group;
each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers, and two A groups can form a cyclic structure including aromatic, partially saturated, or saturated cyclic or fused ring system;
each X is, independently, hydrogen, halogen or a substituted or unsubstituted $C_1$ to $C_{20}$ hydrocarbyl, and two X groups can form a cyclic structure including aromatic, partially saturated, or saturated cyclic or fused ring system;
further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated;
(b) obtaining a vinyl terminated polyethylene having:
(i) at least 60% allyl chain ends, based on the total unsaturations;
(ii) a molecular weight distribution of less than or equal to 4.0; and
(iii) a Mn ($^1$HNMR) of at least 20,000 g/mol.

This invention also relates to a supported catalyst system comprising:
(i) a support material;
(ii) an alumoxane activator having from about 1 wt % to about 14 wt % trimethylaluminum, based on the weight of the alumoxane activator; and
(iii) a metallocene compound represented by the formula:

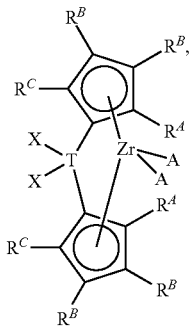

wherein:
T is Si or Ge;
each $R^A$ is a $C_1$ to $C_{20}$ substituted or unsubstituted hydrocarbyl group;
each $R^B$ is, independently, H or a $C_1$ to $C_8$ substituted or unsubstituted hydrocarbyl group, or a group represented by the formula —$CH_2R^x$;
wherein $R^x$ is a $C_1$ to $C_{20}$ substituted or unsubstituted hydrocarbyl group, provided that at least one $R^B$ is methyl or a group represented by the formula —$CH_2R^x$;
each $R^C$ is, independently, H or a $C_1$ to $C_{20}$ substituted or unsubstituted hydrocarbyl group;
each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers, and two A groups can form a cyclic structure including aromatic, partially saturated, or saturated cyclic or fused ring system;
each X is, independently, hydrogen, halogen, or a substituted or unsubstituted $C_1$ to $C_{20}$ hydrocarbyl, and two X groups can form a cyclic structure including aromatic, partially saturated or saturated cyclic or fused ring system; and
further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated.

This invention also relates to a vinyl terminated polyethylene having: (a) at least 60% allyl chain ends, based on the total unsaturations; (b) a molecular weight distribution of less than or equal to 4.0; (c) a g'(vis) of greater than 0.95; and (d) an Mn ($^1$HNMR) of at least 20,000 g/mol.

This invention also relates to reaction products of the vinyl terminated polyethylene and a modifying agent, wherein the reaction product is a functionalized polyethylene having: (i) at least 50% modified groups; (ii) a molecular weight distribution of less than or equal to 4.0; and (iii) a g'(vis) of 0.95 or less.

This invention also relates to an article comprising the vinyl terminated polyethylene and/or the functionalized polyethylene.

BRIEF DESCRIPTION OF THE DRAWINGS

FIG. 1 is a plot of the branching index, g'(vis) versus the hexene ($C_6$) content of the ethylene copolymers of Example 1.

DETAILED DESCRIPTION

Polyethylenes with high percentage of allyl chain ends may be produced using supported non-metallocene catalysts comprising metals such as Cr and Fe. However, the molecular weight distribution (MWD) of these polyethylenes is typically very broad. Using supported metallocene compounds may produce more narrow MWD polyethylenes, but very few supported metallocene compounds have been shown to yield a high percentage of allyl chain ends. The parity between number average molecular weight obtained from GPC data and that obtained by NMR data is poor which generally indicates that large amounts of doubly saturated polyethylene chains are produced. Additionally, although polyethylenes having a high percentage of allyl chain ends may be made from unsupported metallocene compounds and non-coordinating anion activators, processes using unsupported metallocene compounds typically result in reactor fouling. Allyl chain ends are reported as a molar percentage of the total number of moles of unsaturated groups (that is, the sum of allyl chain ends, vinylidene chain ends, vinylene chain ends, and the like).

The inventors have advantageously found that through the selection of a metallocene compound ligand, a metallocene compound metal and/or modification of an alumoxane activator of a supported metallocene compound that polyethylenes having high percentages of allyl chain ends may be produced without reactor fouling. The polyethylene is composed of discrete particles and is free flowing.

Definitions

For the purposes of this invention and the claims thereto, the new numbering scheme for the Periodic Table Groups is used as in CHEMICAL AND ENGINEERING NEWS, 63(5), 27 (1985). Therefore, a "Group 4 metal" is an element from Group 4 of the Periodic Table.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gP/gcat/hr. "Catalyst activity" is a measure of how many grams of polymer of polymer are produced using a polymerization catalyst comprising W g of catalyst (cat) and may be expressed by the following formula: P/W and expressed in units of gP/g(cat), and is typically used for batch processes. Catalyst activity may be converted to catalyst productivity by taking into account the run time of the batch process: catalyst productivity=catalyst activity/T, where T is the run time in hours.

An "olefin," alternatively referred to as "alkene," is a linear, branched, or cyclic compound of carbon and hydrogen having at least one double bond. For the purposes of this invention and the claims thereto, when a polymer is referred to as "comprising an olefin," the olefin present in the polymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. "Polymer," as used herein, includes oligomers (up to 100 mer units) and larger polymers (greater than 100 mer units).

A "homopolymer" is a polymer having mer units that are the same. A "copolymer" is a polymer having two or more mer units that are different from each other. A "terpolymer" is a polymer having three mer units that are different from each other. "Different," as used to refer to mer units, indicates that the mer units differ from each other by at least one atom or are different isomerically. Accordingly, the definition of copolymer, as used herein, includes terpolymers and the like.

As used herein, "molecular weight" means number average molecular weight (Mn), unless otherwise stated. As used herein, Mn is number average molecular weight (measured by $^1$H NMR, unless stated otherwise), Mw is weight average molecular weight (measured by Gel Permeation Chromatography, GPC), and Mz is z average molecular weight (measured by GPC), wt % is weight percent, mol % is mole percent, vol % is volume percent, and mol is mole. Molecular weight distribution (MWD) is defined to be Mw (measured by GPC) divided by Mn (measured by GPC), Mw/Mn.

Mn ($^1$H NMR) is determined according to the NMR methods described below. Mn(GPC) is determined using the GPC method, as described below. For the purpose of the claims, unless otherwise stated, Mn is determined by $^1$H NMR. Unless otherwise noted, all molecular weights (e.g., Mw, Mn, Mz) have units of g/mol.

The unsaturated chain end of inventive polyethylenes comprises an "allyl chain end." An "allyl chain end" is represented by $CH_2CH—CH_2—$, as shown in the formula:

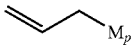

where $M_p$ represents the polymer chain. "Vinyl terminated," as referred to throughout means having an allyl chain end. Preferably, the inventive polyethylenes also have a saturated chain end.

Supported Metallocene Catalyst System

This invention relates to a supported catalyst system comprising:
(i) a support material (preferably $Al_2O_3$, $ZrO_2$, $SiO_2$, and combinations thereof, more preferably $SiO_2$, $Al_2O_3$, or $SiO_2/Al_2O_3$);
(ii) an alumoxane activator having from about 1 wt % to about 14 wt % trimethylaluminum (preferably less than 13 wt %, preferably less than 12 wt %, preferably less than 10 wt %, preferably less than 5 wt %, or 0 wt %, or, optionally, greater than 0 wt %, or greater than 1 wt %), based on the weight of the alumoxane activator; and
(iii) a metallocene compound represented by the formula:

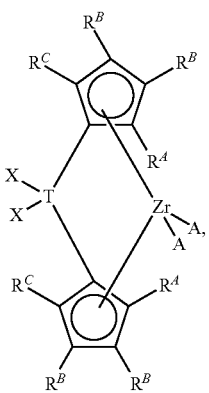

wherein:
T is Si or Ge (preferably T is Si);
each $R^A$ is a $C_1$ to $C_{20}$ substituted or unsubstituted hydrocarbyl group (preferably $R^A$ is methyl or ethyl; preferably methyl);
each $R^B$ is, independently, H or a $C_1$ to $C_8$ substituted or unsubstituted hydrocarbyl group, or a group represented by the formula —$CH_2R^x$ (preferably $R^B$ is methyl, n-propyl, n-butyl, benzyl, sec-butyl, or —$CH_2$-cyclopropyl);
wherein $R^x$ is a $C_1$ to $C_{20}$ substituted or unsubstituted hydrocarbyl group, provided that at least one $R^B$ is methyl or a group represented by the formula —$CH_2R^x$ (preferably —$CH_2R^x$ is one of n-propyl, n-butyl, sec-butyl, —$CH_2$-cyclopropyl, or benzyl groups);
each $R^C$ is, independently, H or a $C_1$ to $C_{20}$ substituted or unsubstituted hydrocarbyl group (preferably $R^C$ is H);
each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers (preferably A is Cl or methyl), and two A groups can form a cyclic structure including aromatic, partially saturated, or saturated cyclic or fused ring system;
each X is, independently, hydrogen, halogen or a substituted or unsubstituted $C_1$ to $C_{20}$ hydrocarbyl, and two X groups can form a cyclic structure including aromatic, partially saturated, or saturated cyclic or fused ring system (preferably X is methyl, ethyl, hexyl, silacyclobutyl, or silacyclopentyl);
further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated (preferably $R^B$ and/or $R^A$ or $R^C$ fuse to form a substituted or unsubstituted indene or a fluorene; preferably the metallocene compound is not a bis-fluorenyl compound); and
(iv) optionally, at least one cocatalyst (or scavenger) (preferably one or more of triethylaluminum, tri-isobutylaluminum, tri-n-hexylaluminum, tri-n-octylaluminum, diethyl aluminum chloride, dibutyl zinc, diethyl zinc, and the like).

The supported metallocene catalyst system of this invention comprises a support material, an alumoxane activator, a metallocene compound, and an optional cocatalyst/scavenger, each of which is discussed in turn below.

Support Material

In embodiments of the invention herein, the catalyst system comprises an inert support material. Preferably, the supported material is a porous support material, for example, talc, and inorganic oxides. Other support materials include zeolites, clays, organoclays, or any other organic or inorganic support material, or mixtures thereof.

Preferably, the support material is an inorganic oxide in a finely divided form. Suitable inorganic oxide materials for use in metallocene catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like.

Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 $m^2/g$ to about 700 $m^2/g$, pore volume in the range of from about 0.1 cc/g to about 4.0 cc/g, and average particle size in the range of from about 5 µm to about 500 µm. More preferably, the surface area of the support material is in the range of from about 50 $m^2/g$ to about 500 $m^2/g$, pore volume of from about 0.5 cc/g to about 3.5 cc/g, and average particle size of from about 10 µm to about 200 µm. Most preferably, the surface area of the support material is in the range is from about 100 $m^2/g$ to about 400 $m^2/g$, pore volume from about 0.8 cc/g to about 3.0 cc/g, and average particle size is from about 5 µm to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area ≥300 $m^2/gm$, pore volume ≥1.65 $cm^3/gm$), and is marketed under the tradenames of DAVISON 952 or DAVISON 955 by the Davison Chemical Division of W. R. Grace and Company, are particularly useful. In other embodiments, DAVIDSON 948 is used.

In some embodiments of this invention, the support material may be dry, that is, free of absorbed water. Drying of the support material can be achieved by heating or calcining at about 100° C. to about 1000° C., preferably at least about 600° C. When the support material is silica, it is typically heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material preferably has at least some reactive hydroxyl (OH) groups.

Alumoxane Activators

The term "activator" is used herein to be any compound which can activate any one of the metallocene compounds described above by converting the neutral catalyst compound to a catalytically active metallocene compound cation. Preferred activators typically include alumoxane compounds (or "alumoxanes") and modified alumoxane compounds.

Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane, isobutylalumoxane, and mixtures thereof. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another useful alumoxane is a modified methylalumoxane (MMAO) cocatalyst type 3A (commercially available from Akzo Chemicals, Inc. under the trade name Modified Methylalumoxane type 3A, covered under U.S. Pat. No. 5,041,584). In preferred embodiments of this invention, the activator is an alkylalumoxane, preferably methylalumoxane or isobutylalumoxane.

In preferred embodiments of this invention, the alumoxane activator is a TMA-depleted activator (where TMA means trimethylaluminum). The inventors have advantageously found that using a TMA-depleted alkylalumoxane contributes to producing a polymer with higher allyl chain ends. Commercial alumoxanes, such as methylalumoxane (MAO) and modified MAO, and mixtures of other of those with another alumoxane, for example isobutylalumoxane, often tend to comprise some residual trimethylaluminum as an impurity. For example, one common method of making MAO is the hydrolysis of trimethylaluminum (TMA). Such hydrolysis, however, tends to leave residual TMA in the MAO which may have negative effects on polymerization. Any methods known in the art to remove TMA may be used. For example, to produce a TMA-depleted alumoxane activator, a solution of alumoxane (such as methylalumoxane), for example, 30 wt % in toluene may be diluted in toluene and the aluminum alkyl (such as TMA in the case of MAO) is removed from the solution, for example, by combination with trimethylphenol and filtration of the solid.

In such embodiments, the TMA-depleted alumoxane activator comprises from about 1 wt % to about 14 wt % trimethylaluminum (preferably less than 13 wt %, preferably less than 12 wt %, preferably less than 10 wt %, preferably less than 5 wt %, or preferably 0 wt %, or, optionally, greater than 0 wt % or greater than 1 wt %), based on the total weight of the alumoxane activator.

The minimum activator metal-to-zirconium (preferably aluminum from the alumoxane to zirconium from the zirconocene catalyst of the catalyst system) ratio is a 1:1 molar ratio. Alternate preferred ratios include up to 5000:1, preferably up to 500:1, preferably up to 200:1, preferably up to 100:1, or preferably from 1:1 to 50:1.

In some embodiments of this invention, the alumoxane activator may be supported on the support material prior to contact with the metallocene compound. In other embodiments, the alumoxane activator is combined with the metallocene compound prior to being placed upon the support material.

Optional Cocatalysts

In addition to these alumoxane activator compounds, cocatalysts may be used. Aluminum alkyl or organoaluminum compounds which may be utilized as cocatalysts (or scavengers) include, for example, triethylaluminum, triisobutylaluminum, tri-n-hexylaluminum, tri-n-octylaluminum, diethyl aluminum chloride, dibutyl zinc, diethyl zinc, and the like.

Preferably, cocatalyst is present at a molar ratio of cocatalyst metal to transition metal of less than 100:1, preferably less than 50:1, preferably less than 15:1, preferably less than 10:1. In alternate embodiments, the cocatalyst is present at 0 wt %.

Other additives may also be used, as desired, such as one or more scavengers, promoters, modifiers, reducing agents, oxidizing agents, aluminum alkyls, or silanes.

Metallocene Compounds

A metallocene catalyst is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof. The inventors have surprisingly found that the zirconium analogs of useful metallocenes have better activity and produce greater amounts of vinyl chain ends.

For the purposes of this invention and the claims thereto, when catalyst systems are described as comprising neutral stable forms of the components, it is well understood by one of ordinary skill in the art, that the ionic form of the component is the form that reacts with the monomers to produce polymers.

Useful metallocene compounds of this invention are represented by the formula:

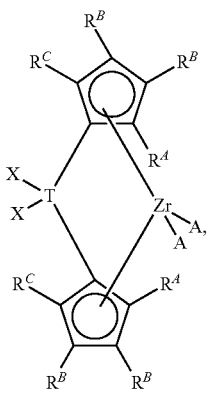

wherein:

T is Si or Ge (preferably T is Si);

each $R^A$ is a $C_1$ to $C_{20}$ substituted or unsubstituted hydrocarbyl group (preferably $R^A$ is methyl or ethyl; preferably methyl);

each $R^B$ is, independently, H or a $C_1$ to $C_8$ substituted or unsubstituted hydrocarbyl group, or a group represented by the formula —$CH_2R^x$ (preferably $R^B$ is H, ethyl, n-propyl, n-butyl, benzyl, sec-butyl, or —$CH_2$-cyclopropyl);

wherein $R^x$ is a $C_1$ to $C_{20}$ substituted or unsubstituted hydrocarbyl group, provided that at least one $R^B$ is methyl or a group represented by the formula —$CH_2R^x$ (preferably —$CH_2R^x$ is one of ethyl, n-propyl, n-butyl, sec-butyl, —$CH_2$-cyclopropyl, or benzyl groups);

each $R^C$ is, independently, H or a $C_1$ to $C_{20}$ substituted or unsubstituted hydrocarbyl group (preferably $R^C$ is H);

each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers (preferably A is Cl or methyl), and two A groups can form a cyclic structure including aromatic, partially saturated, or saturated cyclic or fused ring system;

each X is, independently, hydrogen, halogen, or a substituted or unsubstituted $C_1$ to $C_{20}$ hydrocarbyl, and two X groups can form a cyclic structure including aromatic, partially saturated, or saturated cyclic or fused ring system (preferably X is methyl, ethyl, silacyclobutyl, or silacyclopentyl); and further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated (preferably $R^B$ and/or $R^A$ or $R^C$ fuse to form a substituted or unsubstituted indene or a fluorene; preferably the metallocene compound is not a bis-fluorenyl compound).

In preferred embodiments, the metallocene compound is asymmetric, which is defined to mean that groups of different sizes are bridged by the $TX_2$ bridge, for example, the metallocene compound may be a bis-cyclopentadienyl-indenyl compound, a bis cyclopentadienyl-fluorenyl compound, a bis-indenyl-fluorenyl compound. In other embodiments, the metallocene compound is symmetric, for example, a bis-indenyl compound.

Preferred metallocene compounds may be represented by the formula:

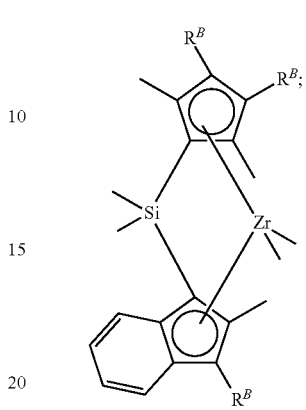

wherein $R^B$ is as defined above.

Particularly preferred metallocene compounds may be represented by the formula:

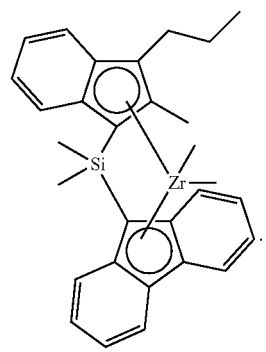

Other preferred metallocenes include:
$Me_2Si(3-n-propylCpMe_3)(C_{13}H_8)ZrCl_2$; $Me_2Si(3-n-propylCpMe_3)(C_{13}H_8)ZrMe_2$; $Me_2Si(3-n-butylCpMe_3)(C_{13}H_8)ZrCl_2$; $Me_2Si(3-n-butylCpMe_3)(C_{13}H_8)ZrMe_2$; $Me_2Si(3-benzylCpMe_3)(C_{13}H_8)ZrCl_2$; $Me_2Si(3-benzylCpMe_3)(C_{13}H_8)ZrMe_2$; $Me_2Si(3-CH_2-cyclopropylCpMe_3)(C_{13}H_8)ZrCl_2$; $Me_2Si(3-CH_2-cyclopropylCpMe_3)(C_{13}H_8)ZrMe_2$; $Me_2Ge(3-n-propylCpMe_3)(C_{13}H_8)ZrCl_2$; $Me_2Ge(3-n-propylCpMe_3)(C_{13}H_8)ZrMe_2$; $Et_2Si(3-n-propylCpMe_3)(C_{13}H_8)ZrCl_2$; $Et_2Si(3-n-propylCpMe_3)(C_{13}H_8)ZrMe_2$; $(Hexyl)_2Si(3-n-propylCpMe_3)(C_{13}H_8)ZrCl_2$; $(Hexyl)_2Si(3-n-propylCpMe_3)(C_{13}H_8)ZrMe_2$; $[(C_3H_6)Si](3-n-propylCpMe_3)(C_{13}H_8)ZrCl_2$; $[(C_3H_6)Si](3-n-propylCpMe_3)(C_{13}H_8)ZrMe_2$; $[(C_4H_8)Si](3-n-propylCpMe_3)(C_{13}H_8)ZrCl_2$; $[(C_4H_8)Si](3-n-propylCpMe_3)(C_{13}H_8)ZrMe_2$; $Me_2Si(CpMe_4)(C_{13}H_8)ZrCl_2$; $Me_2Si(CpMe_4)(C_{13}H_8)ZrMe_2$; $Me_2Ge(CpMe_4)(C_{13}H_8)ZrCl_2$; $Me_2Ge(CpMe_4)(C_{13}H_8)ZrMe_2$; $Et_2Si(CpMe_4)(C_{13}H_8)ZrCl_2$; $Et_2Si(CpMe_4)(C_{13}H_8)ZrMe_2$; $(Hexyl)_2Si(CpMe_4)(C_{13}H_8)ZrCl_2$; $(Hexyl)_2Si(CpMe_4)(C_{13}H_8)ZrMe_2$; $[(C_3H_6)Si](CpMe_4)(C_{13}H_8)ZrCl_2$; $[(C_3H_6)Si](CpMe_4)(C_{13}H_8)ZrMe_2$; $[(C_4H_8)Si](CpMe_4)(C_{13}H_8)ZrCl_2$; $[(C_4H_8)Si](CpMe_4)(C_{13}H_8)ZrMe_2$; $Me_2Si(3-n-propylCpMe_3)(2,3-Me_2C_9H_4)ZrCl_2$; $Me_2Si(3-n-butylCpMe_3)(2,3-Me_2C_9H_4)ZrCl_2$; $Me_2Si(3-benzylCpMe_3)(2,3-Me_2C_9H_4)ZrCl_2$; $Me_2Si(3-CH_2-cyclopropylCpMe_3)(2,3-

Me$_2$C$_9$H$_4$)ZrCl$_2$; Me$_2$Ge(3-n-propylCpMe$_3$)(2,3-Me$_2$C$_9$H$_4$)ZrCl$_2$; Et$_2$Si(3-n-propylCpMe$_3$)(2,3-Me$_2$C$_9$H$_4$)ZrCl$_2$; (Hexyl)$_2$Si(3-n-propylCpMe$_3$)(2,3-Me$_2$C$_9$H$_4$)ZrCl$_2$; [(C$_3$H$_6$)Si](3-n-propylCpMe$_3$)(2,3-Me$_2$C$_9$H$_4$)ZrCl$_2$; [(C$_4$H$_8$)Si](3-n-propylCpMe$_3$)(2,3-Me$_2$C$_9$H$_4$)ZrCl$_2$; Me$_2$Si(CpMe$_4$)(2-methyl,3-n-propylC$_9$H$_4$)ZrCl$_2$; Me$_2$Si(CpMe$_4$)(2-methyl,3-n-butylC$_9$H$_4$)ZrCl$_2$; Me$_2$Si(CpMe$_4$)(2-methyl,3-benzylC$_9$H$_4$)ZrCl$_2$; Me$_2$Si(CpMe$_4$)(2-methyl,3-sec-butylC$_9$H$_4$)ZrCl$_2$; Me$_2$Si(CpMe$_4$)(2-methyl,3-CH$_2$-cyclopropylC$_9$H$_4$)ZrCl$_2$; Me$_2$Ge(CpMe$_4$)(2-methyl,3-n-propylC$_9$H$_4$)ZrCl$_2$; Me$_2$Ge(CpMe$_4$)(2-methyl,3-n-butylC$_9$H$_4$)ZrCl$_2$; Me$_2$Ge(CpMe$_4$)(2-methyl,3-benzylC$_9$H$_4$)ZrCl$_2$; Me$_2$Ge(CpMe$_4$)(2-methyl,3-sec-butylC$_9$H$_4$)ZrCl$_2$; Me$_2$Ge(CpMe$_4$)(2-methyl,3-CH$_2$-cyclopropylC$_9$H$_4$)ZrCl$_2$; Et$_2$Si(CpMe$_4$)(2-methyl,3-n-propylC$_9$H$_4$)ZrCl$_2$; Et$_2$Si(CpMe$_4$)(2-methyl,3-n-butylC$_9$H$_4$)ZrCl$_2$; Et$_2$Si(CpMe$_4$)(2-methyl,3-benzylC$_9$H$_4$)ZrCl$_2$; Et$_2$Si(CpMe$_4$)(2-methyl,3-sec-butylC$_9$H$_4$)ZrCl$_2$; Et$_2$Si(CpMe$_4$)(2-methyl,3-CH$_2$-cyclopropylC$_9$H$_4$)ZrCl$_2$; (Hexyl)$_2$Si(CpMe$_4$)(2-methyl,3-n-propylC$_9$H$_4$)ZrCl$_2$; (Hexyl)$_2$Si(CpMe$_4$)(2-methyl,3-n-butylC$_9$H$_4$)ZrCl$_2$; (Hexyl)$_2$Si(CpMe$_4$)(2-methyl,3-benzylC$_9$H$_4$)ZrCl$_2$; (Hexyl)$_2$Si(CpMe$_4$)(2-methyl,3-sec-butylC$_9$H$_4$)ZrCl$_2$; (Hexyl)$_2$Si(CpMe$_4$)(2-methyl,3-CH$_2$-cyclopropylC$_9$H$_4$)ZrCl$_2$; [(C$_3$H$_6$)Si](CpMe$_4$)(2-methyl,3-n-propylC$_9$H$_4$)ZrCl$_2$; [(C$_3$H$_6$)Si(CpMe$_4$)(2-methyl,3-n-butylC$_9$H$_4$)ZrCl$_2$; [(C$_3$H$_6$)Si](CpMe$_4$)(2-methyl,3-benzylC$_9$H$_4$)ZrCl$_2$; [(C$_3$H$_6$)Si](CpMe$_4$)(2-methyl,3-sec-butylC$_9$H$_4$)ZrCl$_2$; [(C$_3$H$_6$)Si](CpMe$_4$)(2-methyl,3-CH$_2$-cyclopropylC$_9$H$_4$)ZrCl$_2$; [(C$_4$H$_8$)Si](CpMe$_4$)(2-methyl,3-n-propylC$_9$H$_4$)ZrCl$_2$; [(C$_4$H$_8$)Si(CpMe$_4$)(2-methyl,3-n-butylC$_9$H$_4$)ZrCl$_2$; [(C$_4$H$_8$)Si](CpMe$_4$)(2-methyl,3-benzylC$_9$H$_4$)ZrCl$_2$; [(C$_4$H$_8$)Si](CpMe$_4$)(2-methyl,3-sec-butylC$_9$H$_4$)ZrCl$_2$; [(C$_4$H$_8$)Si](CpMe$_4$)(2-methyl,3-CH$_2$-cyclopropylC$_9$H$_4$)ZrCl$_2$; Me$_2$Si(3-n-propylCpMe$_3$)(CpMe$_4$)ZrCl$_2$; Me$_2$Si(3-n-propylCpMe$_3$)(CpMe$_4$)ZrMe$_2$; Me$_2$Si(3-n-butylCpMe$_3$)(CpMe$_4$)ZrCl$_2$; Me$_2$Si(3-n-butylCpMe$_3$)(CpMe$_4$)ZrMe$_2$; Me$_2$Si(3-benzylCpMe$_3$)(CpMe$_4$)ZrCl$_2$; Me$_2$Si(3-benzylCpMe$_3$)(CpMe$_4$)ZrMe$_2$; Me$_2$Si(3-CH$_2$-cyclopropylCpMe$_3$)(CpMe$_4$)ZrCl$_2$; Me$_2$Si(3-CH$_2$-cyclopropylCpMe$_3$)(CpMe$_4$)ZrMe$_2$; Me$_2$Ge(3-n-propylCpMe$_3$)(CpMe$_4$)ZrCl$_2$; Me$_2$Ge(3-n-propylCpMe$_3$)(CpMe$_4$)ZrMe$_2$; Et$_2$Si(3-n-propylCpMe$_3$)(CpMe$_4$)ZrCl$_2$; Et$_2$Si(3-n-propylCpMe$_3$)(CpMe$_4$)ZrMe$_2$; (Hexyl)$_2$Si(3-n-propylCpMe$_3$)(CpMe$_4$)ZrCl$_2$; (Hexyl)$_2$Si(3-n-propylCpMe$_3$)(CpMe$_4$)ZrMe$_2$; [(C$_3$H$_6$)Si](3-n-propylCpMe$_3$)(CpMe$_4$)ZrCl$_2$; [(C$_3$H$_6$)Si](3-n-propylCpMe$_3$)(CpMe$_4$)ZrMe$_2$; [(C$_4$H$_8$)Si](3-n-propylCpMe$_3$)(CpMe$_4$)ZrCl$_2$; [(C$_4$H$_8$)Si](3-n-propylCpMe$_3$)(CpMe$_4$)ZrMe$_2$; rac-Me$_2$Si(2-Me,3-n-propylC$_9$H$_4$)(2,3-Me$_2$C$_9$H$_4$)ZrCl$_2$; rac-Me$_2$Si(2-Me,3-n-propylC$_9$H$_4$)$_2$ZrCl$_2$; rac-Me$_2$Si(2-Me,3-n-butylC$_9$H$_4$)(2,3-Me$_2$C$_9$H$_4$)ZrCl$_2$; rac-Me$_2$Si(2-Me,3-n-butylC$_9$H$_4$)$_2$ZrCl$_2$; rac-Me$_2$Si(2-Me,3-CH$_2$-cyclopropylC$_9$H$_4$)(2,3-Me$_2$C$_9$H$_4$)ZrCl$_2$; rac-Me$_2$Si(2-Me,3-CH$_2$-cyclopropylC$_9$H$_4$)$_2$ZrCl$_2$; rac-Me$_2$Ge(2-Me,3-n-propylC$_9$H$_4$)(2,3-Me$_2$C$_9$H$_4$)ZrCl$_2$; rac-Me$_2$Ge(2-Me,3-n-propylC$_9$H$_4$)$_2$ZrCl$_2$; rac-Et$_2$Si(2-Me,3-n-propylC$_9$H$_4$)(2,3-Me$_2$C$_9$H$_4$)ZrCl$_2$; Et$_2$Si(2-Me,3-n-propylC$_9$H$_4$)$_2$ZrCl$_2$; rac-(Hexyl)$_2$Si(2-Me,3-n-propylC$_9$H$_4$)(2,3-Me$_2$C$_9$H$_4$)ZrCl$_2$; rac-(Hexyl)$_2$Si(2-Me,3-n-propylC$_9$H$_4$)$_2$ZrCl$_2$; rac-[(C$_3$H$_6$)Si](2-Me,3-n-propylC$_9$H$_4$)(2,3-Me$_2$C$_9$H$_4$)ZrCl$_2$; rac-[(C$_3$H$_6$)Si](2-Me,3-n-propylC$_9$H$_4$)$_2$ZrCl$_2$; rac-[(C$_4$H$_8$)Si](2-Me,3-n-propylC$_9$H$_4$)(2,3-Me$_2$C$_9$H$_4$)ZrCl$_2$; rac-[(C$_4$H$_8$)Si](2-Me,3-n-propylC$_9$H$_4$)$_2$ZrCl$_2$; Me$_2$Si(C$_{13}$H$_8$)(2-methyl,3-n-propylC$_9$H$_4$)ZrCl$_2$; Me$_2$Si(C$_{13}$H$_8$)(2-methyl,3-n-butylC$_9$H$_4$)ZrCl$_2$; Me$_2$Si(C$_{13}$H$_8$)(2-methyl,3-benzylC$_9$H$_4$)ZrCl$_2$; Me$_2$Si(C$_{13}$H$_8$)(2-methyl,3-sec-butylC$_9$H$_4$)ZrCl$_2$; Me$_2$Si(C$_{13}$H$_8$)(2-methyl,3-CH$_2$-cyclopropylC$_9$H$_4$)ZrCl$_2$; Me$_2$Ge(C$_{13}$H$_8$)(2-methyl,3-n-propylC$_9$H$_4$)ZrCl$_2$; Me$_2$Ge(C$_{13}$H$_8$)(2-methyl,3-n-butylC$_9$H$_4$)ZrCl$_2$; Me$_2$Ge(C$_{13}$H$_8$)(2-methyl,3-benzylC$_9$H$_4$)ZrCl$_2$; Me$_2$Ge(C$_{13}$H$_8$)(2-methyl,3-sec-butylC$_9$H$_4$)ZrCl$_2$; Me$_2$Ge(C$_{13}$H$_8$)(2-methyl,3-CH$_2$-cyclopropylC$_9$H$_4$)ZrCl$_2$; Et$_2$Si(C$_{13}$H$_8$)(2-methyl,3-n-propylC$_9$H$_4$)ZrCl$_2$; Et$_2$Si(C$_{13}$H$_8$)(2-methyl,3-n-butylC$_9$H$_4$)ZrCl$_2$; Et$_2$Si(C$_{13}$H$_8$)(2-methyl,3-benzylC$_9$H$_4$)ZrCl$_2$; Et$_2$Si(C$_{13}$H$_8$)(2-methyl,3-sec-butylC$_9$H$_4$)ZrCl$_2$; Et$_2$Si(C$_{13}$H$_8$)(2-methyl,3-CH$_2$-cyclopropylC$_9$H$_4$)ZrCl$_2$; (Hexyl)$_2$Si(C$_{13}$H$_8$)(2-methyl,3-n-propylC$_9$H$_4$)ZrCl$_2$; (Hexyl)$_2$Si(C$_{13}$H$_8$)(2-methyl,3-n-butylC$_9$H$_4$)ZrCl$_2$; (Hexyl)$_2$Si(C$_{13}$H$_8$)(2-methyl,3-benzylC$_9$H$_4$)ZrCl$_2$; (Hexyl)$_2$Si(C$_{13}$H$_8$)(2-methyl,3-sec-butylC$_9$H$_4$)ZrCl$_2$; (Hexyl)$_2$Si(C$_{13}$H$_8$)(2-methyl,3-CH$_2$-cyclopropylC$_9$H$_4$)ZrCl$_2$; [(C$_3$H$_6$)Si](C$_{13}$H$_8$)(2-methyl,3-n-propylC$_9$H$_4$)ZrCl$_2$; [(C$_3$H$_6$)Si(C$_{13}$H$_8$)(2-methyl,3-n-butylC$_9$H$_4$)ZrCl$_2$; [(C$_3$H$_6$)Si](C$_{13}$H$_8$)(2-methyl,3-benzylC$_9$H$_4$)ZrCl$_2$; [(C$_3$H$_6$)Si](C$_{13}$H$_8$)(2-methyl,3-sec-butylC$_9$H$_4$)ZrCl$_2$; [(C$_3$H$_6$)Si](C$_{13}$H$_8$)(2-methyl,3-CH$_2$-cyclopropylC$_9$H$_4$)ZrCl$_2$; [(C$_4$H$_8$)Si](C$_{13}$H$_8$)(2-methyl,3-n-propylC$_9$H$_4$)ZrCl$_2$; [(C$_4$H$_8$)Si(C$_{13}$H$_8$)(2-methyl,3-n-butylC$_9$H$_4$)ZrCl$_2$; [(C$_4$H$_8$)Si](C$_{13}$H$_8$)(2-methyl,3-benzylC$_9$H$_4$)ZrCl$_2$; [(C$_4$H$_8$)Si](C$_{13}$H$_8$)(2-methyl,3-sec-butylC$_9$H$_4$)ZrCl$_2$; [(C$_4$H$_8$)Si](C$_{13}$H$_8$)(2-methyl,3-CH$_2$-cyclopropylC$_9$H$_4$)ZrCl$_2$; and zirconium dimethyl analogs of the above zirconium dichloride compounds wherein the Cl groups on the Zr are replaced with CH$_3$ groups; wherein Me is methyl; Et is ethyl; C$_9$H$_4$ is an indenyl group; C$_{13}$H$_8$ is a fluorenyl group; [(C$_3$H$_6$)Si] is silacyclobutyl bridge; and [(C$_4$H$_8$)Si] is silacyclopentyl bridge.

Methods of Making the Catalyst System

Any method of supporting the metallocene compound and alumoxane activator may be used. In some embodiments of this invention, the support material, typically having reactive surface groups, typically hydroxyl groups, is slurried in a non-polar solvent and the resulting slurry is contacted with a solution of an alumoxane activator, preferably TMA-depleted alumoxane. The slurry mixture may be heated to about 0° C. to about 70° C., preferably to about 25° C. to about 60° C., preferably at room temperature (25° C.). Contact times typically range from about 0.5 hours to about 24 hours, from about 2 hours to about 16 hours, or from about 4 hours to about 8 hours.

Suitable non-polar solvents are materials in which all of the reagents used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, alone or in combination, may also be employed.

In embodiments of the invention herein, the support material is contacted with a solution of an alumoxane activator to form a supported alumoxane activator. The period of time for contact between the activator and the support material is as long as is necessary to titrate the reactive groups on the support material. To "titrate" is meant to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the metallocene compound and an alumoxane activator: the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.5 to about 0.9 millimoles per gram, preferably about 0.7 (mmols/gm) is typically achieved. Thus, the exact molar ratio of the activator to the surface reactive groups on the carrier will vary. Preferably, this is determined on a case-by-case basis to assure that only so much of the activator is added to the solution as will be deposited onto the support material without leaving excess of the activator in the solution.

The amount of the activator which will be deposited onto the support material without leaving excess in the solution can be determined in any conventional manner, e.g., by adding the activator to the slurry of the carrier in the solvent, while stirring the slurry, until the activator is detected as a solution in the solvent by any technique known in the art, such as by $^1$H NMR. For example, for the silica support material heated at about 600° C., the amount of the activator added to the slurry is such that the molar ratio of Al to the hydroxyl groups (OH) on the silica is about 0.5:1 to about 4:1, preferably about 0.8:1 to about 3:1, more preferably about 0.9:1 to about 2:1 and most preferably about 1:1. The amount of Al in/on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644. In another embodiment, it is also possible to add such an amount of the activator which is in excess of that which will be deposited onto the support material, and then remove, e.g., by filtration and washing.

The supported activator is then slurried into an appropriate solvent, preferably a non-polar solvent. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed. The metallocene compound is added to the slurry mixture and heated to a temperature in the range of from 0° C. to about 70° C., preferably from about 25° C. to about 60° C., most preferably at 25° C. Contact times typically range from about 0.5 hours to about 24 hours, from about 2 hours to about 16 hours, or from about 4 hours to about 8 hours. The volatiles are removed to yield the supported catalyst system, preferably as a free-flowing solid.

In other embodiments, the metallocene compound is contacted with the alumoxane activator in solution, preferably in a solution of non-polar solvent, such as those above. The solution may be heated to 0° C. to about 70° C., preferably to about 25° C. to about 60° C., preferably at 25° C. Contact times may range from about 0.5 hours to about 24 hours, from about 2 hours to about 16 hours, or from about 4 hours to about 8 hours. The metallocene-activator solution is then contacted with the support material to form a slurry mixture. The slurry mixture may be heated to 0° C. to about 70° C., preferably to about 25° to about 60° C., preferably at 25° C. Contact times may range from about 0.5 hours to about 24 hours, from about 2 hours to about 16 hours, or from about 4 hours to about 8 hours. The volatiles are removed, preferably under vacuum, to yield the supported catalyst system, preferably as a free-flowing solid.

In some embodiments, the weight ratio of the zirconocene catalyst to the solid support material may be from about 10:1 to about 0.0001:1, from about 1:1 to about 0.001:1, or from about 0.1:1 to about 0.001:1. The weight ratio of the support material to the alumoxane activator compound may range from about 1:10 to about 100:1, from about 1:1 to about 100:1, or from about 1:1 to about 10:1.

In some embodiments, the supported catalyst system is resuspended in a paraffinic agent, such as mineral oil, for easy addition to a reactor system.

Processes to Produce Polyethylene Having Allyl Chain Ends

Accordingly, the present invention relates to a process to produce polyethylene comprising:

(a) contacting ethylene (and preferably less than 2 wt % of a $C_3$ to $C_{40}$ alphaolefin monomer, alternately from 2 to about 20 wt % of a $C_3$ to $C_{40}$ alphaolefin monomer, alternately 0 wt % of a $C_3$ to $C_{40}$ alphaolefin monomer) with the supported metallocene catalyst system described above (preferably with less than 1000 ppm hydrogen, preferably less than 100 ppm hydrogen, preferably less than 50 ppm hydrogen, preferably less than 10 ppm hydrogen, and optionally, preferably 0 wt % of hydrogen) (preferably at a temperature in the range of about 40° C. to about 150° C., preferably from about 50° C. to 120° C., preferably from about 60° C. to 110° C., and/or a pressure in the range of from about 0.55 MPa to about 2.4 MPa, preferably from about 0.62 MPa to about 2.2 MPa, preferably from about 0.75 MPa to about 2.07 MPa);

(b) obtaining a vinyl terminated polyethylene having:
(i) at least 60% allyl chain ends (preferably at least 65%, preferably at least 70%, preferably at least 75%, preferably at least 80%, preferably at least 85%, preferably at least 90%, preferably at least 95%, preferably at least 96%, preferably at least 97%, preferably at least 98%, preferably at least 99%, or preferably at least 100%), based on the total unsaturations;
(ii) a molecular weight distribution of less than or equal to 4.0 (preferably less than or equal to 3.8, preferably less than or equal to 3.5, preferably less than or equal to 3.2, preferably less than or equal to 3.0, preferably less than or equal to 2.8, or preferably less than or equal to 2.5; and preferably greater than 1);
(iii) an Mn ($^1$HNMR) of at least 20,000 g/mol (preferably at least 25,000 g/mol, preferably at least 30,000 g/mol, preferably at least 40,000 g/mol, preferably at least 50,000 g/mol, and, optionally, less than 125,000 g/mol, preferably less than 120,000 g/mol, 115,000 g/mol, 110,000 g/mol, or 100,000 g/mol);
(iv) optionally, an Mn (GPC)/Mn ($^1$HNMR) in the range of from about 0.8 to about 1.2 (preferably from about 0.9 to about 1.1, preferably from about 0.95 to about 1.1); and
(v) optionally, a g'(vis) of greater than 0.95 (preferably greater than 0.96, preferably greater than 0.98, preferably greater than 0.99, and, optionally, preferably less than or equal to 1.0).

Monomers

In embodiments of this invention, where homopolyethylene is produced, the process comprises contacting ethylene and 0 wt % of monomer, specifically 0 wt % of $C_3$ to $C_{40}$ alphaolefin comonomer with a supported metallocene catalyst system.

In embodiments where an ethylene copolymer is produced, the process comprises contacting ethylene monomer with from about 0.1 wt % to about 20 wt % of a $C_3$ to $C_{40}$ alphaolefin monomer (preferably at least 2 wt % comonomer is used, preferably at least 5 wt %, preferably at least 8 wt %, preferably at least 10 wt %, optionally, preferably less than 20 wt % comonomer is used, preferably less than 15 wt %, preferably less than 12 wt %).

Useful comonomers include $C_3$ to $C_{40}$ alphaolefin monomers, preferably $C_4$ to $C_{40}$ alphaolefin monomers, preferably $C_5$ to $C_{40}$ alphaolefin monomers, preferably $C_5$ to $C_{20}$ alphaolefin monomers, or $C_3$ to $C_{12}$ alphaolefin monomers. Examples of useful comonomers include propylene, 1-butene, 1-pentene, 1-hexene, 1-heptene, 1-octene, 1-nonene, 1-decene, and 1-undecene.

Polymerization Processes

Generally speaking, the polymerization process comprises contacting one or more olefinically unsaturated monomers with the supported catalyst system of the invention. The catalysts according to the invention are particularly suited to use in gas phase or slurry polymerization processes where heterogeneous catalysts are typically used. The heterogeneous catalysts of the invention are typically supported on inert support particles, which are then used in a gas phase or liquid process wherein the monomers are contacted with the supported catalyst systems.

Generally, a fluidized gas bed process is used for producing polymers, with a gaseous stream containing one or more monomers being continuously cycled through the fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228.)

In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally, after a distillation, to the reactor. The liquid diluent employed in the polymerization medium is typically an alkane having from 3 to 7 carbon atoms, preferably a branched alkane. The medium employed is preferably liquid under the conditions of polymerization and relatively inert. Preferably, a propane, hexane or an isobutane medium is employed. Non-limiting examples of slurry processes include continuous loop or stirred tank processes. Further examples of slurry processes are described in U.S. Pat. No. 4,613,484. In some embodiments of this invention, the conversion of olefin monomer is at least 10%, based upon polymer yield and the weight of the monomer entering the reaction zone, preferably 20% or more, preferably 30% or more, preferably 50% or more, preferably 80% or more. Conversion is the amount of monomer that is converted to polymer product, is reported as mol %, and is calculated based on the polymer yield and the amount of monomer fed into the reactor.

In some embodiments of this invention, the catalyst productivity is 4500 g/mmol/hour or more, preferably 5000 g/mmol/hour or more, preferably 10,000 g/mmol/hour or more, preferably 50,000 g/mmol/hour or more. In other embodiments, the productivity is at least 80,000 g/mmol/hour, preferably at least 150,000 g/mmol/hour, preferably at least 200,000 g/mmol/hour, preferably at least 250,000 g/mmol/hour, preferably at least 300,000 g/mmol/hour. "Catalyst productivity" is a measure of how many grams of polymer (P) are produced using a polymerization catalyst comprising W g of catalyst (cat), over a period of time of T hours, and may be expressed by the following formula: P/(T×W) and expressed in units of $gPgcat^{-1}hr^{-1}$.

Preferred polymerizations can be run at any temperature and/or pressure suitable to obtain the desired vinyl terminated polyethylenes. The polymerization may be ran at any suitable temperature, such as at a temperature in the range of from about 40° C. to 150° C., preferably from about 60° C. to 120° C.; and at any suitable pressure, preferable pressures may be in the range of from about 0.55 MPa to about 2.4 MPa, preferably from about 0.60 MPa to about 2.2 MPa, or preferably from about 0.65 MPa to about 2.0 MPa.

In a typical polymerization, the run time of the reaction may be up to 300 minutes, preferably in the range of from about 5 to 250 minutes, or preferably from about 10 to 120 minutes.

In some embodiments of this invention, vinyl terminated polyethylene may be advantageously produced in the presence of hydrogen. Preferably, ethylene may be contacted with the metallocene catalyst system in the presence of less than 1000 ppm hydrogen, preferably less than 100 ppm hydrogen, preferably less than 50 ppm hydrogen, or preferably less than 10 ppm hydrogen. In other embodiments of this invention, there is 0 wt % hydrogen present. Preferably, the catalyst productivity (calculated as g/mmol catalyst/hr) is at least 20% higher than the same reaction without hydrogen present, preferably at least 50% higher, preferably at least 100% higher.

In a preferred embodiment of the present invention, the catalyst system used in the polymerization comprises no more than one catalyst compound. A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In tubular reactors, different parts of the tube are considered different zones. In a preferred embodiment, the polymerization occurs in one reaction zone.

Cocatalysts such as triethylaluminum, tri-isobutylaluminum, tri-n-hexylaluminum, tri-n-octylaluminum, diethyl aluminum chloride, dibutyl zinc, diethyl zinc, and the like may be used. In some embodiments, the process of this invention is conducted in the absence of or essentially free of any scavengers, such as triethylaluminum, tri-isobutyl-aluminum, tri-n-hexylaluminum, tri-n-octylaluminum, diethyl aluminum chloride, dibutyl zinc, diethyl zinc, and the like.

Ethylene Polymers

The inventors have surprisingly found that processes of this invention with the selected supported catalyst system produce ethylene homopolymers and copolymers having high percentages of allyl chain ends and a narrow molecular weight distribution.

In embodiments of this invention, the processes of this invention produce a vinyl terminated polyethylene (preferably the polyethylene is in the form of free-flowing, discrete particles) having: (a) at least 60% allyl chain ends (preferably 65%, 70%, 80%, 90%, 95%, 96%, 97%, 98%, 99%, or 100%), based on the total unsaturations; (b) a molecular weight distribution of less than or equal to 4.0 (preferably less than or equal to 3.8, 3.6, 3.5, 3.4, 3.2, 3.0, 2.8, or 2.5; and preferably greater than 1.0); (c) a g'(vis) of greater than 0.95 (preferably greater than 0.96, preferably greater than 0.98, greater than 0.98, and, optionally, preferably less than or equal to 1.0); (d) an Mn ($^{1}$HNMR) of at least 20,000 g/mol (preferably at least 25,000, preferably at least 30,000, preferably at least 40,000, preferably at least 50,000, and, optionally, preferably less than 125,000 g/mol, preferably less than 120,000 g/mol, 115,000 g/mol, 110,000 g/mol, or 100,000 g/mol); and, optionally, (e) an Mn (GPC)/Mn ($^1$HNMR) in the range of from about 0.8 to about 1.2 (preferably from about 0.85 to about 1.15, preferably from about 0.90 to about 1.10, and preferably from about 0.95 to about 1.00).

The processes of this invention preferably produce a vinyl terminated polyethylene in the form of free-flowing, discrete particles. Preferably the free-flowing discrete particles of the polymer concentrate of the present invention may be regarded as a pourable free-flowing polymer concentrate. As such, the particles of the present invention are not tacky or sticky, and thus do not block, which is to say the particles do not stick to one another nor to other surfaces so as to form agglomerates comprising a plurality of pellets to an extent which prevents the pellets from being pourable.

By "pourable free-flowing" it is meant that the particles will flow through a funnel and yield a pourability value according to ASTM D1895 Method B modified to use a funnel having a 29 mm bottom opening as described herein, preferably both initially and after elevated temperature storage (e.g., storage at 120° F. for 7 days). Accordingly, the particles of the present invention are pourable free-flowing in that they may be poured through a funnel having a 2.9 cm opening at the narrow end.

An initial pourability value (i.e., prior to aging or storage) of the particles of the present invention may be about 120 seconds or less, when determined according to ASTM D1895 Method B modified to use a funnel having a 29 mm bottom opening. Preferably, the pourability value is about 60 seconds or less, more preferably about 30 seconds or less, still more preferably about 10 seconds or less, more preferably about 5 seconds or less, still more preferably about 2 seconds or less, when determined according to ASTM D1895 Method B modified to use a funnel having a 29 mm bottom opening. Accordingly, the polymer concentrate of the present invention may preferably be pelletized into a plurality of pourable free flowing particles that may be poured through a funnel having a 29 mm bottom opening. In a preferred embodiment, the plurality of pourable free flowing particles of the polymer concentrate may be poured through a funnel having a 29 mm bottom opening in 120 seconds or less, preferably in 60 seconds or less, more preferably in 30 seconds or less, more preferably in 20 seconds or less.

After aging of the particles at 120° F. for 7 days, the aged pourability value of the particles of the present invention may be about 300 seconds or less, when determined according to ASTM D1895 Method B modified to use a funnel having a 29 mm bottom opening. Preferably, after aging the pourability value is about 200 seconds or less, more preferably about 100 seconds or less, still more preferably about 50 seconds or less, more preferably about 30 seconds or less, still more preferably about 10 seconds or less, when determined according to ASTM D1895 Method B modified to use a funnel having a 29 mm bottom opening.

In some embodiments, the processes of this invention, such as a slurry process, produce an ethylene homopolymer having: an Mn (i) at least 95% allyl chain ends (preferably at least 96%, preferably at least 97%, preferably at least 98%, preferably at least 99%, or preferably 100%), based on the total unsaturations; (ii) a molecular weight distribution of less than or equal to 3.5 (preferably less than 3.2, preferably less than 3.0, preferably less than 2.8, preferably less than 2.5); (iii) an Mn ($^1$HNMR) of at least 20,000 g/mol (preferably at least 25,000, preferably at least 30,000, preferably at least 40,000, preferably at least 50,000, or less than 125,000 g/mol, preferably less than 120,000 g/mol, 115,000 g/mol, 110,000 g/mol, or 100,000 g/mol); optionally, (iv) an Mn (GPC)/Mn ($^1$HNMR) in the range of from about 0.8 to about 1.2 (preferably from about 0.9 to about 1.1, preferably from about 0.95 to about 1.1); and, optionally, (v) a g'(vis) of greater than 0.95 (preferably greater than 0.96, preferably greater than 0.98, preferably greater than 0.99, and, optionally, preferably less than or equal to 1.0).

In other embodiments, the processes of this invention produce an ethylene copolymer having (i) at least 60% allyl chain ends (preferably at least 65% allyl chain ends, preferably at least 70% allyl chain ends, preferably at least 75% allyl chain ends, preferably at least 80% allyl chain ends), based on the total unsaturations; (ii) a molecular weight distribution of less than or equal to 4.0 (preferably less than or equal to 3.8, preferably less than or equal to 3.5, preferably less than or equal to 3.2, preferably less than or equal to 3.0, preferably less than or equal to 2.8, preferably less than or equal to 2.5); (iii) an Mn ($^1$HNMR) of at least 20,000 g/mol (preferably at least 25,000, preferably at least 30,000, preferably at least 40,000, preferably at least 50,000, and, optionally, less than 125,000 g/mol, preferably less than 120,000 g/mol, 115,000 g/mol, 110,000 g/mol, or 100,000 g/mol); optionally, (iv) an Mn (GPC)/Mn ($^1$HNMR) in the range of from about 0.8 to about 1.2 (preferably from about 0.9 to about 1.1, preferably from about 0.95 to about 1.1); and, optionally, (v) a g'(vis) of greater than 0.95 (preferably greater than 0.96, preferably greater than 0.98, preferably greater than 0.99, and, optionally, preferably less than or equal to 1.0).

In particular embodiments, the copolymer may be an ethylene/propylene, ethylene/butene, ethylene/pentene, ethylene/hexene, or ethylene/octene copolymer.

Ethylene homopolymers of this invention have at least 95% allyl chain ends (preferably at least 96%, preferably at least 97%, preferably at least 98%, preferably at least 99%, or preferably 100%), based on the total unsaturations. Ethylene copolymers of this invention have at least 60% allyl chain ends (preferably at least 65%, preferably at least 70%, preferably at least 75%, preferably at least 80%, preferably at least 85%, preferably at least 90%, preferably at least 95%, preferably at least 96%, preferably at least 97%, preferably at least 98%, preferably at least 99%, or preferably 100%), based on the total unsaturations. The number of allyl chain ends is determined using $^1$H NMR at 120° C. using deuterated tetrachloroethane as the solvent on an at least 250 MHz NMR spectrometer. Resconi has reported proton assignments (neat perdeuterated tetrachloroethane used for proton spectra; all spectra were recorded at 100° C. on a Bruker spectrometer operating at 500 MHz for proton) for vinyl terminated oligomers in *J. American Chemical Soc.*, 114, 1992, 1025-1032. Allyl chain ends are reported as a molar percentage of the total number of moles of unsaturated groups (that is, the sum of allyl chain ends, vinylidene chain ends, and vinylene chain ends).

Polymers produced by processes of this invention have an Mn ($^1$HNMR) of at least 20,000 g/mol (preferably at least 25,000, preferably at least 30,000, preferably at least 40,000, preferably at least 50,000, and, optionally, less than 125,000 g/mol, preferably less than 120,000 g/mol, 115,000 g/mol, 110,000 g/mol, or 100,000 g/mol). $^1$H NMR data is collected at 380K in a 5 mm probe in $C_2D_2Cl_4$ or toluene-d8 using a Varian or a Bruker spectrometer with a $^1$H frequency of at least 400 MHz (available from Agilent Technologies, Santa Clara, Calif.). For the purpose of the claims, $^1$H NMR data is collected at 380K in a 5 mm probe in toluene-d8 using a Bruker spectrometer.

$^1$H NMR data was recorded using a maximum pulse width of 45° C., 8 seconds between pulses and signal averaging 120 transients. Spectral signals were integrated and the number of unsaturation types per 1000 carbons was calculated by multiplying the different groups by 1000 and dividing the result by the total number of carbons. Mn ($^1$H NMR) was calculated by dividing the total number of unsaturated species into 14,000, and has units of g/mol.

The chemical shift regions for the olefin types are defined to be between the following spectral regions.

| Unsaturation Type | Region (ppm) | Number of hydrogens per structure |
| --- | --- | --- |
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Polymer produced by processes of this invention also have a Mn (GPC)/Mn ($^1$HNMR) in the range of from about 0.8 to about 1.2 (preferably from about 0.9 to about 1.1, preferably from about 0.95 to about 1.1).

Mn (GPC), Mw, Mz and g'(vis) were determined using a Gel Permeation Chromatography (GPC) method using a High Temperature Size Exclusion Chromatograph (SEC, either from Waters Corporation, Milford, Mass. or Polymer Laboratories (now part of Varian Inc., available from Agilent Technologies)), equipped with a differential refractive index detector (DRI). Experimental details are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B columns are used. The nominal flow rate was 0.5 cm$^3$/min and the nominal injection volume is 300 µL. The various transfer lines, columns, and differential refractometer (the DRI detector) were contained in an oven maintained at 135° C. Solvent for the SEC experiment was prepared by dissolving 6 grams of butylated hydroxy toluene as an antioxidant in 4 liters of Aldrich reagent grade 1, 2, 4 trichlorobenzene (TCB). The TCB mixture was then filtered through a 0.7 µm glass pre-filter and subsequently through a 0.1 µm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute and the DRI was allowed to stabilize for 8 to 9 hours before injecting the first sample. The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and ethylene polymers and 0.1 otherwise. Units of parameters used throughout this description of the SEC method were: concentration was expressed in g/cm$^3$, molecular weight was expressed in g/mol, and intrinsic viscosity was expressed in dL/g.

Polymers produced by the processes of this invention also have a g'(vis) of greater than 0.95 (preferably greater than 0.96, preferably greater than 0.98, preferably greater than 0.99, and, optionally, preferably less than or equal to 1.0). The branching index (g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits,
wherein $[\eta]_i$ is the intrinsic viscosity over the chromatographic slices, i.
The branching index g'(vis) is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and α exponents.

In any embodiment of the invention, the vinyl terminated polyethylenes described herein may have a melting point (DSC first melt, as described below) of from 60° C. to 130° C., alternately 50° C. to 100° C. Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C., to obtain heat of crystallization (Tc). The sample is held at −80° C. for 5 min and then heated at a heating rate of 10° C./min to 25° C. The glass transition temperature (Tg) is measured from the heating cycle. Otherwise, the sample is equilibrated at 25° C., then heated at a heating rate of 10° C./min to 150° C. The endothermic melting transition, if present, is analyzed for onset of transition and peak temperature. The melting temperatures reported (Tm) are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In any embodiment of the invention, the vinyl terminated polyethylenes may have less than 3 wt % of functional groups selected from hydroxide, aryls and substituted aryls, halogens, alkoxys, carboxylates, esters, acrylates, oxygen, nitrogen, and carboxyl; preferably less than 2 wt %, more preferably less than 1 wt %, more preferably less than 0.5 wt %, more preferably less than 0.1 wt %, more preferably 0 wt %, based upon the weight of the oligomer.

Uses of Ethylene Polymers Having Allyl Chain Ends

The ethylene polymers having high percentages of allyl chain ends prepared herein may be functionalized by reacting a heteroatom containing group with the allyl group of the polymer, with or without a catalyst. The reaction product is a functionalized polyethylene, having a modified group (derived from the heteroatom containing group). Examples include catalytic hydrosilylation, hydroformylation, hydroboration, epoxidation, hydration, dihydroxylation, hydrohalogenation, hydroamination, or maleation with or without activators such as free radical generators (e.g., peroxides).

This invention also relates to: a functionalized polyethylene having: (i) at least 50% modified groups (preferably 60%, 70%, 80%, 90%, 95%, 96%, 97%, 98%, 99%, or 100%), based on the sum of the total unsaturations and modified groups; (ii) a molecular weight distribution of less than or equal to 4.0 (preferably less than or equal to 3.8, 3.6, 3.5, 3.4, 3.2, 3.0, 2.8, or 2.5; and preferably greater than 1.0); (iii) a g'(vis) of greater than 0.95 (preferably greater than 0.96, 0.97, 0.98, 0.99 or less than or equal to 1.0). Preferably, the functionalized polyethylene also has an Mn (GPC) of at least 16,000 g/mol (preferably at least 25,000, preferably at least 30,000, preferably at least 40,000, preferably at least 50,000, and, optionally, less than 150,000 g/mol, preferably less than 120,000 g/mol, 115,000 g/mol, 110,000 g/mol, or 100,000 g/mol). Preferably, the modified group is one or more of an amine, an aldehyde, an alcohol, an acid, a halide, a succinic acid, a maleic acid, and a maleic anhydride. Preferably, the modified group is one or more of an amine, an aldehyde, an alcohol, an acid, a halide, a succinic acid, a maleic acid, and a maleic anhydride.

In some embodiments, the ethylene polymers having high percentages of allyl chain ends produced herein are functionalized as described in U.S. Pat. No. 6,022,929; A. Toyota, T. Tsutsui, and N. Kashiwa, Polymer Bulletin 48, pp. 213-219, 2002; J. Am. Chem. Soc., 1990, 112, pp. 7433-7434; and U.S. Ser. No. 12/487,739, filed on Jun. 19, 2009.

The functionalized polymers can be used in blown films, nanocomposites, pigment compositions, in situ compatibilizers (for use, for example, in tie layers), oil additivation, and many other applications. Preferred uses include additives for lubricants and/or fuels.

In particular embodiments of the invention herein, the ethylene polymers having high percentages of allyl chain ends disclosed herein, or functionalized analogs thereof, are useful as additives. In some embodiments, the ethylene polymers having high percentages of allyl chain ends disclosed herein, or functionalized analogs thereof, are useful as additives in a lubricant. Particular embodiments relate to a lubricant comprising the ethylene polymers having high percentages of allyl chain ends disclosed herein, or functionalized analogs thereof.

In other embodiments, the ethylene polymers having high percentages of allyl chain ends disclosed herein may be used as monomers for the preparation of polymer products. Processes that may be used for the preparation of these polymer products include coordinative polymerization and acid-catalyzed polymerization.

In other embodiments, the invention relates to:
1. A supported catalyst system comprising:
(i) a support material (preferably $Al_2O_3$, $ZrO_2$, $SiO_2$, and combinations thereof, more preferably $SiO_2$, $Al_2O_3$, or $SiO_2/Al_2O_3$);
(ii) an alumoxane activator (preferably an alkylalumoxane, preferably methylalumoxane or isobutylalumoxane) having from about 1 wt % to about 14 wt % trimethylaluminum (preferably less than 13 wt %, preferably less than 12 wt %, preferably less than 10 wt %, preferably less than 5 wt %, or 0 wt %, or, optionally, greater than 0 wt %, or greater than 1 wt %), based on the weight of the alumoxane activator; and
(iii) a metallocene compound represented by the formula:

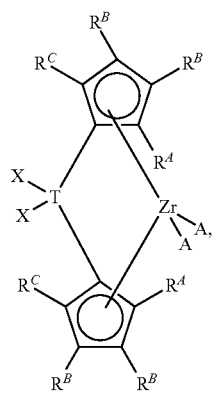

wherein
T is Si or Ge (preferably T is Si);
each $R^A$ is a $C_1$ to $C_{20}$ substituted or unsubstituted hydrocarbyl group (preferably $R^A$ is methyl or ethyl; preferably methyl);
each $R^B$ is, independently, H or a $C_1$ to $C_8$ substituted or unsubstituted hydrocarbyl group, or a group represented by the formula —$CH_2R^x$ (preferably $R^B$ is methyl, n-propyl, n-butyl, benzyl, sec-butyl, or —$CH_2$-cyclopropyl);
wherein $R^x$ is a $C_1$ to $C_{20}$ substituted or unsubstituted hydrocarbyl group, provided that at least one $R^B$ is methyl or a group represented by the formula —$CH_2R^x$ (preferably —$CH_2R^x$ is one of n-propyl, n-butyl, sec-butyl, —$CH_2$-cyclopropyl or benzyl groups);
each $R^C$ is, independently, H or a $C_1$ to $C_{20}$ substituted or unsubstituted hydrocarbyl group (preferably $R^C$ is H);
each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers (preferably A is Cl or methyl), and two A groups can form a cyclic structure including aromatic, partially saturated, or saturated cyclic or fused ring system;
each X is, independently, hydrogen, halogen or a substituted or unsubstituted $C_1$ to $C_{20}$ hydrocarbyl, and two X groups can form a cyclic structure including aromatic, partially saturated, or saturated cyclic or fused ring system (preferably X is methyl, ethyl, hexyl, silacyclobutyl, or silacyclopentyl);
further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated (preferably $R^B$ and/or $R^A$, or $R^C$ fuse to form a substituted or unsubstituted indene or a fluorene; preferably the metallocene compound is not a bis-fluorenyl compound); and (iv) optionally, at least one cocatalyst or scavenger (preferably one or more of triethylaluminum, tri-isobutylaluminum, tri-n-hexylaluminum, tri-n-octylaluminum, diethyl aluminum chloride, dibutyl zinc, diethyl zinc, and the like).

2. The catalyst system of paragraph 1, wherein the metallocene compound is represented by the following structure, wherein $R^B$ is as defined in paragraph 1:

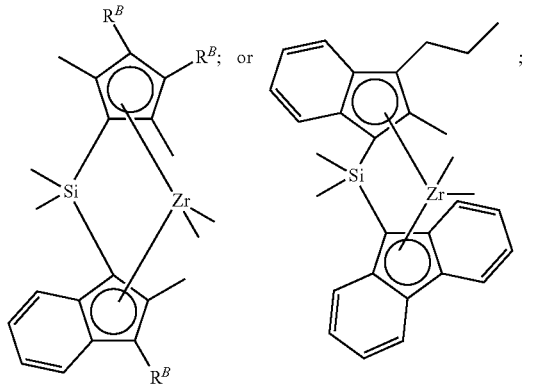

(preferably the metallocene compound is one or more of: Me$_2$Si(3-n-propylCpMe$_3$)(C$_{13}$H$_8$)ZrCl$_2$; Me$_2$Si(3-n-propylCpMe$_3$)(C$_{13}$H$_8$)ZrMe$_2$; Me$_2$Si(3-n-butylCpMe$_3$)(C$_{13}$H$_8$)ZrCl$_2$; Me$_2$Si(3-n-butylCpMe$_3$)(C$_{13}$H$_8$)ZrMe$_2$; Me$_2$Si(3-benzylCpMe$_3$)(C$_{13}$H$_8$)ZrCl$_2$; Me$_2$Si(3-benzylCpMe$_3$)(C$_{13}$H$_8$)ZrMe$_2$; Me$_2$Si(3-CH$_2$-cyclopropylCpMe$_3$)(C$_{13}$H$_8$)ZrCl$_2$; Me$_2$Si(3-CH$_2$-cyclopropylCpMe$_3$)(C$_{13}$H$_8$)ZrMe$_2$; Me$_2$Ge(3-n-propylCpMe$_3$)(C$_{13}$H$_8$)ZrCl$_2$; Me$_2$Ge(3-n-propylCpMe$_3$)(C$_{13}$H$_8$)ZrMe$_2$; Et$_2$Si(3-n-propylCpMe$_3$)(C$_{13}$H$_8$)ZrCl$_2$; Et$_2$Si(3-n-propylCpMe$_3$)(C$_{13}$H$_8$)ZrMe$_2$; (Hexyl)$_2$Si(3-n-propylCpMe$_3$)(C$_{13}$H$_8$)ZrCl$_2$; (Hexyl)$_2$Si(3-n-propylCpMe$_3$)(C$_{13}$H$_8$)ZrMe$_2$; [(C$_3$H$_6$)Si](3-n-propylCpMe$_3$)(C$_{13}$H$_8$)ZrCl$_2$; [(C$_3$H$_6$)Si](3-n-propylCpMe$_3$)(C$_{13}$H$_8$)ZrMe$_2$; [(C$_4$H$_8$)Si](3-n-propylCpMe$_3$)(C$_{13}$H$_8$)ZrCl$_2$; [(C$_4$H$_8$)Si](3-n-propylCpMe$_3$)(C$_{13}$H$_8$)ZrMe$_2$; Me$_2$Si(CpMe$_4$)(C$_{13}$H$_8$)ZrCl$_2$; Me$_2$Si(CpMe$_4$)(C$_{13}$H$_8$)ZrMe$_2$; Me$_2$Ge(CpMe$_4$)(C$_{13}$H$_8$)ZrCl$_2$; Me$_2$Ge(CpMe$_4$)(C$_{13}$H$_8$)ZrMe$_2$; Et$_2$Si(CpMe$_4$)(C$_{13}$H$_8$)ZrCl$_2$; Et$_2$Si(CpMe$_4$)(C$_{13}$H$_8$)ZrMe$_2$; (Hexyl)$_2$Si(CpMe$_4$)(C$_{13}$H$_8$)ZrCl$_2$; (Hexyl)$_2$Si(CpMe$_4$)(C$_{13}$H$_8$)ZrMe$_2$; [(C$_3$H$_6$)Si](CpMe$_4$)(C$_{13}$H$_8$)ZrCl$_2$; [(C$_3$H$_6$)Si](CpMe$_4$)(C$_{13}$H$_8$)ZrMe$_2$; [(C$_4$H$_8$)Si](CpMe$_4$)(C$_{13}$H$_8$)ZrCl$_2$; [(C$_4$H$_8$)Si](CpMe$_4$)(C$_{13}$H$_8$)ZrMe$_2$; Me$_2$Si(3-n-propylCpMe$_3$)(2,3-Me$_2$C$_9$H$_4$)ZrCl$_2$; Me$_2$Si(3-n-butylCpMe$_3$)(2,3-Me$_2$C$_9$H$_4$)ZrCl$_2$; Me$_2$Si(3-benzylCpMe$_3$)(2,3-Me$_2$C$_9$H$_4$)ZrCl$_2$; Me$_2$Si(3-CH$_2$-cyclopropylCpMe$_3$)(2,3-Me$_2$C$_9$H$_4$)ZrCl$_2$; Me$_2$Ge(3-n-propylCpMe$_3$)(2,3-Me$_2$C$_9$H$_4$)ZrCl$_2$; Et$_2$Si(3-n-propylCpMe$_3$)(2,3-Me$_2$C$_9$H$_4$)ZrCl$_2$; (Hexyl)$_2$Si(3-n-propylCpMe$_3$)(2,3-Me$_2$C$_9$H$_4$)ZrCl$_2$; [(C$_3$H$_6$)Si](3-n-propylCpMe$_3$)(2,3-Me$_2$C$_9$H$_4$)ZrCl$_2$; [(C$_4$H$_8$)Si](3-n-propylCpMe$_3$)(2,3-Me$_2$C$_9$H$_4$)ZrCl$_2$; Me$_2$Si(CpMe$_4$)(2-methyl,3-n-propylC$_9$H$_4$)ZrCl$_2$; Me$_2$Si(CpMe$_4$)(2-methyl,3-n-butylC$_9$H$_4$)ZrCl$_2$; Me$_2$Si(CpMe$_4$)(2-methyl,3-benzylC$_9$H$_4$)ZrCl$_2$; Me$_2$Si(CpMe$_4$)(2-methyl,3-sec-butylC$_9$H$_4$)ZrCl$_2$; Me$_2$Si(CpMe$_4$)(2-methyl,3-CH$_2$-cyclopropylC$_9$H$_4$)ZrCl$_2$; Me$_2$Ge(CpMe$_4$)(2-methyl,3-n-propylC$_9$H$_4$)ZrCl$_2$; Me$_2$Ge(CpMe$_4$)(2-methyl,3-n-butylC$_9$H$_4$)ZrCl$_2$; Me$_2$Ge(CpMe$_4$)(2-methyl,3-benzylC$_9$H$_4$)ZrCl$_2$; Me$_2$Ge(CpMe$_4$)(2-methyl,3-sec-butylC$_9$H$_4$)ZrCl$_2$; Me$_2$Ge(CpMe$_4$)(2-methyl,3-CH$_2$-cyclopropylC$_9$H$_4$)ZrCl$_2$; Et$_2$Si(CpMe$_4$)(2-methyl,3-n-propylC$_9$H$_4$)ZrCl$_2$; Et$_2$Si(CpMe$_4$)(2-methyl,3-n-butylC$_9$H$_4$)ZrCl$_2$; Et$_2$Si(CpMe$_4$)(2-methyl,3-benzylC$_9$H$_4$)ZrCl$_2$; Et$_2$Si(CpMe$_4$)(2-methyl,3-sec-butylC$_9$H$_4$)ZrCl$_2$; Et$_2$Si(CpMe$_4$)(2-methyl,3-CH$_2$-cyclopropylC$_9$H$_4$)ZrCl$_2$; (Hexyl)$_2$Si(CpMe$_4$)(2-methyl,3-n-propylC$_9$H$_4$)ZrCl$_2$; (Hexyl)$_2$Si(CpMe$_4$)(2-methyl,3-n-butylC$_9$H$_4$)ZrCl$_2$; (Hexyl)$_2$Si(CpMe$_4$)(2-methyl,3-benzylC$_9$H$_4$)ZrCl$_2$; (Hexyl)$_2$Si(CpMe$_4$)(2-methyl,3-sec-butylC$_9$H$_4$)ZrCl$_2$; (Hexyl)$_2$Si(CpMe$_4$)(2-methyl,3-CH$_2$-cyclopropylC$_9$H$_4$)ZrCl$_2$; [(C$_3$H$_6$)Si](CpMe$_4$)(2-methyl,3-n-propylC$_9$H$_4$)ZrCl$_2$; [(C$_3$H$_6$)Si](CpMe$_4$)(2-methyl,3-n-butylC$_9$H$_4$)ZrCl$_2$; [(C$_3$H$_6$)Si](CpMe$_4$)(2-methyl,3-benzylC$_9$H$_4$)ZrCl$_2$; [(C$_3$H$_6$)Si](CpMe$_4$)(2-methyl,3-sec-butylC$_9$H$_4$)ZrCl$_2$; [(C$_3$H$_6$)Si](CpMe$_4$)(2-methyl,3-CH$_2$-cyclopropylC$_9$H$_4$)ZrCl$_2$; [(C$_4$H$_8$)Si](CpMe$_4$)(2-methyl,3-n-propylC$_9$H$_4$)ZrCl$_2$; [(C$_4$H$_8$)Si](CpMe$_4$)(2-methyl,3-n-butylC$_9$H$_4$)ZrCl$_2$; [(C$_4$H$_8$)Si](CpMe$_4$)(2-methyl,3-benzylC$_9$H$_4$)ZrCl$_2$; [(C$_4$H$_8$)Si](CpMe$_4$)(2-methyl,3-sec-butylC$_9$H$_4$)ZrCl$_2$; [(C$_4$H$_8$)Si](CpMe$_4$)(2-methyl,3-CH$_2$-cyclopropylC$_9$H$_4$)ZrCl$_2$; Me$_2$Si(3-n-propylCpMe$_3$)(CpMe$_4$)ZrCl$_2$; Me$_2$Si(3-n-propylCpMe$_3$)(CpMe$_4$)ZrMe$_2$; Me$_2$Si(3-n-butylCpMe$_3$)(CpMe$_4$)ZrCl$_2$; Me$_2$Si(3-n-butylCpMe$_3$)(CpMe$_4$)ZrMe$_2$; Me$_2$Si(3-benzylCpMe$_3$)(CpMe$_4$)ZrCl$_2$; Me$_2$Si(3-benzylCpMe$_3$)(CpMe$_4$)ZrMe$_2$; Me$_2$Si(3-CH$_2$-cyclopropylCpMe$_3$)(CpMe$_4$)ZrCl$_2$; Me$_2$Si(3-CH$_2$-cyclopropylCpMe$_3$)(CpMe$_4$)ZrMe$_2$; Me$_2$Ge(3-n-propylCpMe$_3$)(CpMe$_4$)ZrCl$_2$; Me$_2$Ge(3-n-propylCpMe$_3$)(CpMe$_4$)ZrMe$_2$; Et$_2$Si(3-n-propylCpMe$_3$)(CpMe$_4$)ZrCl$_2$; Et$_2$Si(3-n-propylCpMe$_3$)(CpMe$_4$)ZrMe$_2$; (Hexyl)$_2$Si(3-n-propylCpMe$_3$)(CpMe$_4$)ZrCl$_2$; (Hexyl)$_2$Si(3-n-propylCpMe$_3$)(CpMe$_4$)ZrMe$_2$; [(C$_3$H$_6$)Si](3-n-propylCpMe$_3$)(CpMe$_4$)ZrCl$_2$; [(C$_3$H$_6$)Si](3-n-propylCpMe$_3$)(CpMe$_4$)ZrMe$_2$; [(C$_4$H$_8$)Si](3-n-propylCpMe$_3$)(CpMe$_4$)ZrCl$_2$; [(C$_4$H$_8$)Si](3-n-propylCpMe$_3$)(CpMe$_4$)ZrMe$_2$; rac-Me$_2$Si(2-Me,3-n-propylC$_9$H$_4$)(2,3-Me$_2$C$_9$H$_4$)ZrCl$_2$; rac-Me$_2$Si(2-Me,3-n-propylC$_9$H$_4$)$_2$ZrCl$_2$; rac-Me$_2$Si(2-Me,3-n-butylC$_9$H$_4$)(2,3-Me$_2$C$_9$H$_4$)ZrCl$_2$; rac-Me$_2$Si(2-Me,3-n-butylC$_9$H$_4$)$_2$ZrCl$_2$; rac-Me$_2$Si(2-Me,3-CH$_2$-cyclopropylC$_9$H$_4$)(2,3-Me$_2$C$_9$H$_4$)ZrCl$_2$; rac-Me$_2$Si(2-Me,3-CH$_2$-cyclopropylC$_9$H$_4$)$_2$ZrCl$_2$; rac-Me$_2$Ge(2-Me,3-n-propylC$_9$H$_4$)(2,3-Me$_2$C$_9$H$_4$)ZrCl$_2$; rac-Me$_2$Ge(2-Me,3-n-propylC$_9$H$_4$)$_2$ZrCl$_2$; rac-Et$_2$Si(2-Me,3-n-propylC$_9$H$_4$)(2,3-Me$_2$C$_9$H$_4$)ZrCl$_2$; Et$_2$Si(2-Me,3-n-propylC$_9$H$_4$)$_2$ZrCl$_2$; rac-(Hexyl)$_2$Si(2-Me,3-n-propylC$_9$H$_4$)(2,3-Me$_2$C$_9$H$_4$)ZrCl$_2$; rac-(Hexyl)$_2$Si(2-Me,3-n-propylC$_9$H$_4$)$_2$ZrCl$_2$; rac-[(C$_3$H$_6$)Si](2-Me,3-n-propylC$_9$H$_4$)(2,3-Me$_2$C$_9$H$_4$)ZrCl$_2$; rac-[(C$_3$H$_6$)Si](2-Me,3-n-propylC$_9$H$_4$)$_2$ZrCl$_2$; rac-[(C$_4$H$_8$)Si](2-Me,3-n-propylC$_9$H$_4$)(2,3-Me$_2$C$_9$H$_4$)ZrCl$_2$; rac-[(C$_4$H$_8$)Si](2-Me,3-n-propylC$_9$H$_4$)$_2$ZrCl$_2$; Me$_2$Si(C$_{13}$H$_8$)(2-methyl,3-n-propylC$_9$H$_4$)ZrCl$_2$; Me$_2$Si(C$_{13}$H$_8$)(2-methyl,3-n-butylC$_9$H$_4$)ZrCl$_2$; Me$_2$Si(C$_{13}$H$_8$)(2-methyl,3-benzylC$_9$H$_4$)ZrCl$_2$; Me$_2$Si(C$_{13}$H$_8$)(2-methyl,3-sec-butylC$_9$H$_4$)ZrCl$_2$; Me$_2$Si(C$_{13}$H$_8$)(2-methyl,3-CH$_2$-cyclopropylC$_9$H$_4$)ZrCl$_2$; Me$_2$Ge(C$_{13}$H$_8$)(2-methyl,3-n-propylC$_9$H$_4$)ZrCl$_2$; Me$_2$Ge(C$_{13}$H$_8$)(2-methyl,3-n-butylC$_9$H$_4$)ZrCl$_2$; Me$_2$Ge(C$_{13}$H$_8$)(2-methyl,3-benzylC$_9$H$_4$)ZrCl$_2$; Me$_2$Ge(C$_{13}$H$_8$)(2-methyl,3-sec-butylC$_9$H$_4$)ZrCl$_2$; Me$_2$Ge(C$_{13}$H$_8$)(2-methyl,3-CH$_2$-cyclopropylC$_9$H$_4$)ZrCl$_2$; Et$_2$Si(C$_{13}$H$_8$)(2-methyl,3-n-propylC$_9$H$_4$)ZrCl$_2$; Et$_2$Si(C$_{13}$H$_8$)(2-methyl,3-n-butylC$_9$H$_4$)ZrCl$_2$; Et$_2$Si(C$_{13}$H$_8$)(2-methyl,3-benzylC$_9$H$_4$)ZrCl$_2$; Et$_2$Si(C$_{13}$H$_8$)(2-methyl,3-sec-butylC$_9$H$_4$)ZrCl$_2$; Et$_2$Si(C$_{13}$H$_8$)(2-methyl,3-CH$_2$-cyclopropylC$_9$H$_4$)ZrCl$_2$; (Hexyl)$_2$Si(C$_{13}$H$_8$)(2-methyl,3-n-propylC$_9$H$_4$)ZrCl$_2$; (Hexyl)$_2$Si(C$_{13}$H$_8$)(2-methyl,3-n-butylC$_9$H$_4$)ZrCl$_2$; (Hexyl)$_2$Si(C$_{13}$H$_8$)(2-methyl,3-benzylC$_9$H$_4$)ZrCl$_2$; (Hexyl)$_2$Si(C$_{13}$H$_8$)(2-methyl,3-sec-butylC$_9$H$_4$)ZrCl$_2$; (Hexyl)$_2$Si(C$_{13}$H$_8$)(2-methyl,3-CH$_2$- cyclopropylC$_9$H$_4$)ZrCl$_2$; [(C$_3$H$_6$)Si](C$_{13}$H$_8$)(2-methyl,3-n-propylC$_9$H$_4$)ZrCl$_2$; [(C$_3$H$_6$)Si](C$_{13}$H$_8$)(2-methyl,3-n-butylC$_9$H$_4$)ZrCl$_2$; [(C$_3$H$_6$)Si](C$_{13}$H$_8$)(2-methyl,3-benzylC$_9$H$_4$)ZrCl$_2$; [(C$_3$H$_6$)Si](C$_{13}$H$_8$)(2-methyl,3-sec-butylC$_9$H$_4$)ZrCl$_2$; [(C$_3$H$_6$)Si](C$_{13}$H$_8$)(2-methyl,3-CH$_2$-cyclopropylC$_9$H$_4$)ZrCl$_2$; [(C$_4$H$_8$)Si](C$_{13}$H$_8$)(2-methyl,3-n-propylC$_9$H$_4$)ZrCl$_2$; [(C$_4$H$_8$)Si](C$_{13}$H$_8$)(2-methyl,3-n-butylC$_9$H$_4$)ZrCl$_2$; [(C$_4$H$_8$)Si](C$_{13}$H$_8$)(2-methyl,3-benzylC$_9$H$_4$)ZrCl$_2$; [(C$_4$H$_8$)Si](C$_{13}$H$_8$)(2-methyl,3-sec-butylC$_9$H$_4$)ZrCl$_2$; [(C$_4$H$_8$)Si](C$_{13}$H$_8$)(2-methyl,3-CH$_2$-cyclopropylC$_9$H$_4$)ZrCl$_2$; wherein Me is methyl, Et is ethyl, C$_9$H$_4$ is an indenyl group; C$_{13}$H$_8$ is a fluorenyl group, [(C$_3$H$_6$)Si] is silacyclobutyl bridge, and [(C$_4$H$_8$)Si] is silacyclopentyl bridge); and further comprising the zirconium dimethyl analogs of the above metallocene compounds, wherein the Cl groups on the Zr are preplaced with CH$_3$ groups.

3. A process to produce polyethylene comprising:
(a) contacting ethylene with the supported metallocene catalyst system of paragraphs 1 to 2 (preferably with less than 1000 ppm hydrogen, preferably with less than 100 ppm hydrogen, preferably with less than 50 ppm hydrogen, preferably with less than 10 ppm hydrogen, and, optionally, there is 0 wt % hydrogen; preferably, the contacting occurs at a temperature in the range of from about 40° C. to about 150° C.; preferably the contacting occurs at a pressure in the range of from about 0.55 MPa to about 2.4 MPa);
(b) obtaining a vinyl terminated polyethylene (preferably the polyethylene is in the form of free-flowing, discrete particles) having: (a) at least 60% allyl chain ends (preferably 65%, 70%, 80%, 90%, 95%, 96%, 97%, 98%, 99%, or 100%), based on total unsaturations; (b) a molecular weight distribution of less than or equal to 4.0 (preferably less than or equal to 3.8, 3.6, 3.5, 3.4, 3.2, 3.0, 2.8, or 2.5; and preferably greater than 1.0); (c) a g'(vis) of greater than 0.95 (preferably greater than 0.96, preferably greater than 0.98, preferably greater than 0.99, and, optionally, preferably less than or equal to 1.0); (d) an Mn ($^1$HNMR) of at least 20,000 g/mol (preferably at least 25,000, preferably at least 30,000, preferably at least 40,000, preferably at least 50,000, and, optionally, less than 125,000 g/mol, preferably less than 120,000 g/mol, 115,000 g/mol, 110,000 g/mol, or 100,000 g/mol); and, optionally, (e) an Mn (GPC)/Mn ($^1$HNMR) in the range of from about 0.8 to about 1.2 (preferably from about 0.85 to about 1.15, preferably from about 0.90 to about 1.10, and preferably from about 0.95 to about 1.00).

4. The process of paragraph 3, wherein the vinyl terminated polyethylene is an ethylene polymer having less than 2 wt % (preferably less than 1.5 wt %, preferably less than 1.0 wt %, preferably less than 0.5 wt %, or, optionally, 0 wt %); or, alternately, from about 2 wt % to about 20 wt % (preferably from about 2 wt % to about 15 wt %, preferably from about 5 wt % to about 15 wt %, preferably from about 5 wt % to about 10 wt %) of a C$_3$ to C$_{40}$ alphaolefin comonomer.

5. The process of paragraphs 3 and 4, where the vinyl terminated polyethylene is an ethylene homopolymer having 0 wt % of a C$_3$ to C$_{40}$ alphaolefin comonomer and has greater than 85% allyl chain ends, based on total unsaturations.

6. The process of paragraphs 3 to 5, wherein there is from about 2 wt % to about 20 wt % of a C$_3$ to C$_{40}$ alphaolefin comonomer, and the vinyl terminated polyethylene has at least 60% allyl chain ends, based on total unsaturations.

7. A vinyl terminated polyethylene produced by the process of paragraphs 3 to 6, (preferably the polyethylene is in the form of free-flowing, discrete particles) having: (i) at least 60% allyl chain ends (preferably 65%, 70%, 80%, 90%, 95%, 96%, 97%, 98%, 99%, or 100%), based on total unsaturations; (ii) a molecular weight distribution of less than or equal to 4.0 (preferably less than or equal to 3.8, 3.6, 3.5, 3.4, 3.2, 3.0, 2.8, or 2.5; and preferably greater than 1.0); (iii) a g'(vis) of greater than 0.95 (preferably greater than 0.96, preferably greater than 0.98, preferably greater than 0.99, and, optionally, preferably less than or equal to 1.0); (iv) an Mn ($^1$HNMR) of at least 20,000 g/mol (preferably at least 25,000, preferably at least 30,000, preferably at least 40,000, preferably at least 50,000, and, optionally, less than 125,000 g/mol, preferably less than 120,000 g/mol, 115,000 g/mol, 110,000 g/mol, or 100,000 g/mol); and (v) optionally, an Mn (GPC)/Mn ($^1$HNMR) in the range of from about 0.8 to about 1.2 (preferably about from 0.85 to about 1.15, preferably from about 0.90 to about 1.10, and preferably from about 0.95 to about 1.00).

8. A reaction product of the vinyl terminated polyethylene of paragraph 7 with a modifying agent (preferably the modifying agent reacts with the allyl chain ends of the vinyl terminated polyethylene), wherein the reaction product is a functionalized polyethylene (preferably the functionalized polyethylene is in the form of free-flowing, discrete particles) having: (i) at least 50% modified groups (preferably, the modified group is one of an amine, an aldehyde, an alcohol, a halide, an acid, a succinic acid, a maleic acid, and a maleic anhydride) (preferably 60%, 70%, 80%, 90%, 95%, 96%, 97%, 98%, 99%, or 100%), based on the sum of the total unsaturations and modified groups; (ii) a molecular weight distribution of less than or equal to 4.0 (preferably less than or equal to 3.8, 3.6, 3.5, 3.4, 3.2, 3.0, 2.8, or 2.5; and preferably greater than 1.0); (iii) a g'(vis) of greater than 0.95 (preferably greater than 0.96, preferably greater than 0.98, preferably greater than 0.99, and, optionally, preferably less than or equal to 1.0); and (iv) optionally an Mn (GPC) of at least 16,000 g/mol (preferably at least 25,000, preferably at least 30,000, preferably at least 40,000, preferably at least 50,000, and, optionally, less than 150,000 g/mol, preferably less than 120,000 g/mol, 115,000 g/mol, 110,000 g/mol, or 100,000 g/mol).

9. A composition comprising the vinyl terminated polyethylene and/or the functionalized polyethylene of paragraphs 7 and 8 (preferably the composition is a nanocomposite, a pigment composition, a compatibilizer for films, a fuel additive, or a lubricant additive).

10. An article comprising the composition of paragraph 9.

11. A fuel or a lubricant comprising the reaction product of paragraph 8.

12. A pigment comprising the reaction product of paragraph 8.

EXAMPLES

The following abbreviations are used below: Me is methyl, Pr is n-propyl, Ph is phenyl, Flu is fluorenyl, Ind is indenyl, Bu is n-butyl, and Bz is benzyl. TMA is trimethylaluminum.

MAO is methylalumoxane and TIBAL is triisobutylaluminum. MAO is obtained from Albemarle (Baton Rouge, La.) and TIBAL is obtained from Sigma Aldrich Co. (St. Louis, Mo.), and both were used as received, unless otherwise stated.

All reactions were carried out under inert atmosphere, preferably nitrogen, unless otherwise stated. All solvents were obtained from Sigma Aldrich Co. and dried before use over 3 A molecular sieves (also obtained from Sigma Aldrich), unless otherwise stated.

Products were characterized by $^1$H NMR and GPC-DRI as follows:

$^1$H NMR $^1$H NMR data was collected at 380K in a 5 mm probe using a Bruker spectrometer with a $^1$H frequency of at least 400 MHz (available from Agilent Technologies, Santa Clara, Calif.). Data was recorded using a maximum pulse width of 45° C., 8 seconds between pulses and signal averaging 120 transients. Spectral signals were integrated and the number of unsaturation types per 1000 carbons was calculated by multiplying the different groups by 1000 and dividing the result by the total number of carbons. Mn was calculated by dividing the total number of unsaturated species into 14,000, and has units of g/mol.

The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

GPC-DRI

Mn, Mw, Mz, and g'(vis) were determined using a Gel Permeation Chromatography (GPC) method using a High Temperature Size Exclusion Chromatograph (SEC, either from Waters Corporation, Milford, Mass. or Polymer Laboratories (now part of Varian Inc., available from Agilent Technologies)), equipped with a differential refractive index detector (DRI). Experimental details are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B columns are used. The nominal flow rate was 0.5 cm$^3$/min, and the nominal injection volume is 300 µL. The various transfer lines, columns and differential refractometer (the DRI detector) were contained in an oven maintained at 135° C. Solvent for the SEC experiment was prepared by dissolving 6 grams of butylated hydroxy toluene as an antioxidant in 4 liters of Aldrich reagent grade 1, 2, 4 trichlorobenzene (TCB). The TCB mixture was then filtered through a 0.7 µm glass pre-filter and subsequently through a 0.1 µm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI was allowed to stabilize for 8 to 9 hours before injecting the first sample. The concentration, c, at each point in the chromatogram was calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and ethylene polymers and 0.1 otherwise. Units of parameters used throughout this description of the SEC method were: concentration was expressed in g/cm$^3$, molecular weight was expressed in g/mol, and intrinsic viscosity was expressed in dL/g.

The branching index (g'(vis)) was calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits, and wherein $[\eta]_i$ is the intrinsic viscosity over the chromatographic slices, i.

The branching index g'(vis) was defined as:

$$g'vis = \frac{[\eta]_{avg}}{kM_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and α exponents.

Example 1

Metallocene compound A, represented by the following structure was used herein:

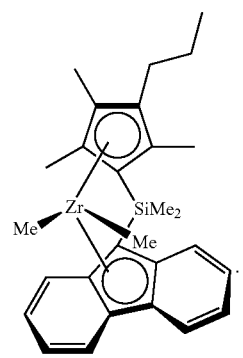

Supported MAO (SMAO) with 12% TMA

Methylalumoxane (MAO, 58.5 g, 30 wt % in toluene) was diluted with 80 mL toluene and Ph$_3$COH (5.2 g, where Ph is phenyl) was slowly added over a 5 minute period. The reaction was stirred for 30 minutes and filtered through a medium glass frit. A 0.2 mL aliquot was pulled from the filtrate to analyze for % TMA by $^1$H NMR. The free TMA was analyzed to be 11.6 wt % by $^1$H NMR.

The solid by-product was further rinsed with toluene (80 ml) and the filtrate was combined with the original filtrate to provide a filtrate mixture. Davison 948 silica gel (49.7 g, calcined at 600° C.) was added to the filtrate mixture and the reaction mixture was stirred for 3 hours. The supported MAO (SMAO) was retained on a glass frit, washed with pentane (80 mL) and dried in vacuo to yield a free-flowing solid.

Supported A (SMCN A)

SMAO (5.05 g, 11.6% TMA) from above was slurried in hexane (30 mL) and reacted with Metallocene compound A (108 mg) for 2 hours. The volatiles were removed by an $N_2$ stream and the solid product was dried in vacuo at 25° C. for 2 hours to yield a supported Metallocene compound A catalyst system as an orange free-flowing solid (SMCN A). Elemental Analysis (Galbraith Laboratories): 6.26% Al, 35.9% Si, and 0.40% Zr.

Polymerization Conditions

Polymerization grade ethylene was used and further purified by passing it through a series of columns: 2250 cc Oxyclear cylinder from Labelear (Oakland, Calif.), followed by a 2250 cc column packed with dried 3 Å mole sieves purchased from Aldrich Chemical Company (St. Louis, Mich.), two 500 cc columns packed with dried 5 Å mole sieves purchased from Aldrich Chemical Company, one 500 cc column packed with ALCOA Selexsorb CD (7×14 mesh) purchased from Coastal Chemical Company (Abbeville, La.), and one 500 cc column packed with ALCOA Selexsorb COS (7×14 mesh) purchased from Coastal Chemical Company.

Polymerization grade hexanes were further purified by passing it through a series of columns: two 500 cc Oxyclear cylinders from Labelear followed by two 500 cc columns packed with dried 3 Å mole sieves purchased from Aldrich Chemical Company and two 500 cc columns packed with dried 5 Å mole sieves purchased from Aldrich Chemical Company and used.

Hexene was obtained from Sigma Aldrich (St. Louis, Mo.) and was dried over NaK amalgam.

Reactor Description and Preparation

Polymerizations were conducted in an inert atmosphere ($N_2$) drybox using 48 Cell Parallel Pressure Reactors (PPR) equipped with external heaters for temperature control, glass inserts (internal volume of reactor=22.5 mL), septum inlets, regulated supply of nitrogen, ethylene, and equipped with disposable PEEK (PolyEtherEtherKetone) mechanical stirrers (800 RPM). The PPRs were prepared for polymerization by purging with dry nitrogen at 150° C. for 5 hours and then at 25° C. for 5 hours.

Run time was varied, as indicated in Table 1A; Metallocene compound (SMCN A)=0.45 mg. Constant ethylene feed pressure was 220 psi.

TABLE 1A

POLYMERIZATION CONDITIONS

| Run | Hexene (mg) | Reactor Pressure psi (MPa) | Temperature (° C.) | Run Time (s) | Yield (mg) |
|---|---|---|---|---|---|
| 1 | 0 | 296.86 (2.05) | 70 | 2100 | 65.4 |
| 2 | 0 | 304.18 (2.10) | 85 | 2101 | 59.1 |
| 3 | 0 | 291.67 (2.01) | 105 | 1003 | 78.8 |
| 4 | 97.5 | 296.9 (2.05) | 70 | 2101 | 72.3 |
| 5 | 97.5 | 301.9 (2.08) | 85.1 | 1333 | 80.5 |
| 6 | 97.5 | 293.5 (2.02) | 105 | 646 | 89.3 |
| 7 | 195 | 295.6 (2.04) | 69.9 | 987 | 75.6 |
| 8 | 195 | 308.6 (2.13) | 85 | 364 | 90.5 |
| 9 | 195 | 294.1 (2.03) | 105 | 1321 | 85.4 |
| 10 | 325 | 296.6 (2.04) | 69.9 | 260.3 | 83.9 |
| 11 | 325 | 305.1 (2.10) | 85.1 | 213.3 | 105.8 |
| 12 | 325 | 289.7 (1.99) | 105 | 2100 | 81.1 |

TABLE 1B

POLYETHYLENE CHARACTERIZATION

| Run | % Vinyls | % VYD* | Hexene (mol %) | Mn ($^1$H NMR) ×10$^3$ g/mol | Mn (GPC$^+$) ×10$^3$ g/mol | Mw (GPC$^+$) ×10$^3$ g/mol | Mw/Mn (GPC/GPC)$^+$ | g'(vis) (GPC$^+$) |
|---|---|---|---|---|---|---|---|---|
| 1 | 100 | 0 | 0 | 80.9 | 76.7 | 207 | 2.7 | 1.04 |
| 2 | — | — | — | — | 61.3 | 162.3 | 2.6 | 1.03 |
| 3 | — | — | — | — | 70.9 | 192.7 | 2.7 | — |
| 4 | — | — | — | — | 68.4 | 187.6 | 2.7 | 1.01 |
| 5 | — | — | 0.7 | — | 58.7 | 148 | 2.5 | — |
| 6 | — | — | — | — | 73.2 | 184.5 | 2.5 | — |
| 7 | 82 | 18 | 1.3 | 74.9 | 62.3 | 169.5 | 2.7 | 0.963 |
| 8 | — | — | — | — | 78.6 | 203 | 2.6 | — |
| 9 | — | — | — | — | 69.8 | 187.8 | 2.7 | — |
| 10 | — | — | 2.4 | — | 65.4 | 151 | 2.3 | 0.949 |
| 11 | — | — | — | — | 83.9 | 189.3 | 2.3 | — |
| 12 | — | — | 2.1 | — | 67.3 | 175.4 | 2.6 | 0.969 |

*VYD means vinylidene.
$^+$GPC values were not corrected for hexene content.

The branching index, g'(vis) is plotted against the % hexene in FIG. 1.

Example 2

Comparative

Comparative Catalysts

General Preparation of SMAO-948: Silica gel used was DAVISON™ 948, (W. R. Grace & Co., Houston, Tex.) calcined at 600° C. under a stream of nitrogen. To a slurry of silica gel (50 g) in toluene (100 ml) was slowly added methyl alumoxane (MAO, 58 g, 30 wt % in toluene, Albemarle, Baton Rouge, La.) with stirring. The MAO used was not stripped of TMA and had about 15 wt % TMA. The reaction mixture was heated to 90° C. for 2 hours, cooled, filtered, and dried in vacuo to yield a free-flowing solid.

Catalyst C-1: $(CpMe_4)(CpPr)ZrCl_2$

The $(CpMe_4)(CpPr)ZrCl_2$ catalyst was purchased from Boulder Scientific (Longmont, Colo.) and used as received. The catalyst may be represented by the structure C-1 in Table 2A.

SMAO-948 (50 g) was slurried in toluene (250 mls) at ambient temperature and reacted with $(CpMe_4)(CpPr)ZrCl_2$ (0.36 g) for 3 hours. The solid catalyst was filtered and dried in vacuo to yield a free-flowing solid.

Catalyst C-2: $(CpMe_4)(CpBz)ZrCl_2$

The $(CpMe_4)(CpBz)ZrCl_2$ catalyst was purchased from Boulder Scientific and used as received. The catalyst may be represented by the structure C-2 in Table 2A.

SMAO-948 (40 g) was slurried in toluene (150 mls) at ambient temperature and reacted with $(CpMe_4)(CpBz)ZrCl_2$ (0.33 g) for 12 hours. The solid catalyst was filtered and dried in vacuo to yield a free-flowing solid.

Catalyst C-3: $Me_2Si(CpMe_4)(CpBz)ZrCl_2$

Sodium cyclopentadiene (50 mls, Aldrich, 2.0 M in THF) was further diluted with 200 mls THF and reacted with benzyl bromide (30 g, Aldrich) for 2 hours. The volatiles were removed and the crude reaction mixture extracted with hexane (50 ml), filtered and the filtrate reduced to an oil. The crude product was Kugelrohr-distilled at maximum vacuum and the distillate from 60° C. to 70° C. was collected. All was dissolved immediately in 100 ml hexane and deprotonated with nBuLi. The white solid product, Cp(Bz)Li, was collected on a glass frit (7.5 g). CpBzLi (2.3 g) was reacted with $CpMe_4HSiMe_2Cl$ (3.0 g, Aldrich) which had been dissolved in THF (40 ml). After 30 minutes the volatiles were removed and the reaction re-dissolved in $Et_2O$ (60 ml) and deprotonated with excess nBuLi. The volatiles were removed after 12 hours and the solid dilithio salt washed with hexane, slurried in $Et_2O$ (50 ml) and reacted with $ZrCl_4$ (2.7 g). The crude reaction was filtered to yield an orange filtrate which was reduced to an oil. The oil was stirred with hexane to yield an orange solid (0.6 g). $^1$H NMR (250 MHz, $C_6D_6$) δ ppm; 7.1-7.0 (m), 6.75 (m), 5.48 (m), 5.24 (m), 4.28 (s), 2.12 (s), 2.07 (s), 1.75 (s), 1.68 (s), 0.39 (s), 0.30 (s). The metallocene compound may be represented by the structure C-3 in Table 2A.

SMAO-948 (10 g) was slurried in toluene (30 mls) at ambient temperature and reacted with $Me_2Si(CpMe_4)(CpBz)ZrCl_2$ (0.19 g) for 12 hours. The solid catalyst was filtered, washed with pentane (40 ml) and dried in vacuo to yield a free-flowing light yellow solid.

Catalyst C-4: $Me_2Si(Flu)(CpMe_4)ZrCl_2$

Fluorene (42 g, Aldrich) was slurried in $Et_2O$ (300 ml) and deprotonated with 1 equivalent nBuLi overnight. The orange solid was collected, washed with hexane, and dried in vacuo (35 g). Fluorenyl lithium (17 g) was dissolved in THF (200 ml) and reacted with $CpMe_4H$—$SiMe_2Cl$ (30.4 g, Aldrich). After 2 hours the volatiles were removed and the crude extracted with $CH_2Cl_2$ (2×60 ml). The extracts were reduced and 30 ml hexane were added and the solution cooled to recrystallize the neutral ligand. A white solid was collected, dissolved in THF (100 ml) and deprotonated with nBuLi (30 ml, 10 M in hexane). After 12 hours the dilithio ligand had fallen out of solution and was collected and washed with hexane. All of the dilithio ligand (8.5 g) was slurried in $Et_2O$ (100 ml) and reacted with $ZrCl_4$ (5.6 g). The solid product was collected, washed with $CH_2Cl_2$ (50 ml) and dried to yield a yellow-orange solid (9.4 g). The $Me_2Si(Flu)(CpMe_4)ZrCl_2$ product is extremely insoluble in most solvents except THF in which it decomposes, and is represented by the structure C-4 in Table 2A. $^1$H NMR (250 MHz, $C_6D_6$) δ ppm; 1.81 (s), 1.78 (s), 0.88 (s).

SMAO-948 (10 g) was slurried in toluene (30 mls) at ambient temperature and reacted with $Me_2Si(Flu)(CpMe_4)ZrCl_2$ (0.19 g) for 12 hours. The solid catalyst was filtered, washed with hexane (40 ml) and dried in vacuo to yield a free-flowing pink solid.

Catalyst C-5: $Me_2Si(n-propylCp)(Cp^*)ZrCl_2$

SMAO-948 (11 g) was slurried in toluene (30 mls) at ambient temperature and reacted with $Me_2Si(n-propylCp)(CpMe_4)ZrCl_2$, represented by the structure C-5 in Table 2A, (0.167 g, synthesized as in U.S. Pat. No. 7,829,495), for 12 hours. The solid catalyst was filtered and dried in vacuo to yield a free-flowing yellow solid.

Catalyst C-6: $(Me_2Ind)_2HfCl_2$ $(Me_2Ind)_2HfCl_2$ was purchased from Boulder Scientific, and used as received. $(Me_2Ind)_2HfCl_2$ is represented by the structure C-6 in Table 2A.

SMAO-948 (10 g) was slurried in toluene 20 mls at ambient temperature and reacted with $(Me_2Ind)_2HfCl_2$ (0.167 g) for 12 hours. The solid catalyst was filtered and dried in vacuo to yield a free-flowing white solid.

Catalyst C-7: $(CpMe_3Pr)(CpMe_4)ZrCl_2$ $CpMe_3(nPr)HLi$ was made as described in U.S. Pat. No. 6,025,512. $CpMe_4$ $HZrCl_3$ was purchased from Strem Chemicals (Newburyport, Mass.).

$CpMe_3(nPr)HLi$ (1.4 g, where nPr is n-propyl) was slurried in $Et_2O$ (100 ml) and reacted with $CpMe_3$ $HZrCl_3$ (3.0 g) for 12 hours at room temperature. The volatiles were removed and the crude reaction mixture extracted with $CH_2Cl_2$ (60 ml), filtered through a glass frit and the filtrate reduced to yield an off-white solid (3.1 g). The metallocene compound may be represented by the structure C-7 in Table 2A. $^1$H NMR (250 MHz, $C_6D_6$) δ ppm; 5.3 (s), 5.27 (s), 2.62 (m), 2.08 (s), 2.0 (s), 1.8 (s), 1.75 (s), 1.73 (s), 1.3 (m), 0.89 (t).

SMAO-948 (7 g) was slurried in toluene (20 mls) at ambient temperature and reacted with $(CpMe_3Pr)(CpMe_4)ZrCl_2$ (0.12 g) for 12 hours. The solid catalyst was filtered and dried in vacuo to yield a free-flowing solid.

These MAO-activated supported metallocene compounds were run in slurry polymerization. The structures are shown in Table 2A, below.

TABLE 2A

COMPARATIVE SUPPORTED METALLOCENE COMPOUNDS

| Supported Metallocene Compound | Structure |
|---|---|
| C-1 | 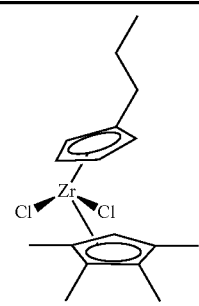 |

TABLE 2A-continued

COMPARATIVE SUPPORTED METALLOCENE COMPOUNDS

| Supported Metallocene Compound | Structure |
|---|---|
| C-2 | *(structure)* |
| C-3 | *(structure)* |
| C-4 | *(structure)* |
| C-5 | *(structure)* |
| C-6 | *(structure)* |
| C-7 | *(structure)* |

General Polymerization

Into a 1 L stainless steel autoclave reactor was added scavenger (TIBAL, as a hexane solution, Table 2B below) followed by 500 mls of isobutane. Ethylene was added (180 psi) and the reactor was heated to 80° C. with stirring rate set at 750 rpm. The supported catalyst system was then added by a short nitrogen purge through a small stainless steel bomb attached securely to the reactor. Ethylene was maintained at the initial pressure throughout the polymerization. The polymerization was allowed to proceed for a set time at which time the reactor was cooled and excess pressure vented into the hood. The solid resin was transferred into an appropriate glass vessel and dried at 80° C. in a vacuum oven for at least 2 hours. The yields and resin characterization are presented in Table 2C.

TABLE 2B

REACTOR CONDITIONS FOR COMPARATIVE EXAMPLES

| Slurry run # | Metallocene compound | TIBAL, 1.0M, mls | Temp. (° C.) | Time, min | Yield, g | Cat. Activity (g pol./ g cat.) |
|---|---|---|---|---|---|---|
| 13A | C-1 | 0.15 | 80 | 30 | 55.26 | 526.7 |
| 13B | C-1 | 0.15 | 80 | 30 | 67.35 | 666.8 |
| 14A | C-2 | 0.15 | 80 | 30 | 54.05 | 530.4 |
| 14B | C-2 | 0.15 | 80 | 30 | 52.91 | 519.2 |
| 15A | C-3 | 0.15 | 80 | 30 | 131.19 | 1360.89 |
| 15B | C-3 | 0.15 | 80 | 30 | 134.07 | 1330.27 |
| 16A | C-4 | 0.15 | 80 | 30 | 47.69 | 476.9 |
| 16B | C-4 | 0.15 | 80 | 30 | 53.17 | 555.00 |
| 17A | C-5 | 0.15 | 80 | 30 | 166.04 | 1685.68 |
| 17B | C-5 | 0.15 | 80 | 30 | 193.38 | 1974.25 |
| 18 | C-6 | 0.15 | 80 | 60 | 19.52 | 195.00 |
| 19 | C-7 | 0.15 | 80 | 30 | 14.03 | 280.60 |

TABLE 2C

POLYMER DATA FROM COMPARATIVE RUNS

| Run # | Mw, ×10³ g/mol (GPC) | Mn, ×10³ g/mol (GPC) | MWD, (GPC/GPC) | Mz, ×10³ g/mol (GPC) | methyl groups per 1000 C | % VYL[1] | Mn, ×10³ g/mol ¹H NMR | VYL[1]/ 1000 carbons | VYD[2]/ 1000 carbons | Other/ 1000 carbons |
|---|---|---|---|---|---|---|---|---|---|---|
| 13A | — | — | 0.95 | — | 0.90 | 17.39 | 60.87 | 0.04 | 0 | 0.19 |
| 13B | — | — | 0.95 | — | 0.90 | 0.00 | 73.68 | 0.00 | 0 | 0.19 |
| 14A | 226.41 | 75.77 | 2.99 | 509.00 | 0.60 | 14.29 | 100.00 | 0.02 | 0 | 0.12 |
| 14B | 218.24 | 67.43 | 3.24 | 507.58 | 0.60 | 22.22 | 155.56 | 0.02 | 0 | 0.07 |
| 15A | 60.68 | 9.34 | 6.49 | 644.37 | 1.80 | 30.95 | 33.33 | 0.13 | 0 | 0.29 |
| 15B | — | — | — | — | 1.80 | 35.90 | 35.90 | 0.14 | 0 | 0.25 |
| 16A | 237.81 | 63.90 | 3.72 | 597.98 | 0.40 | 77.78 | 155.56 | 0.07 | 0 | 0.02 |
| 16B | 232.40 | 66.67 | 3.49 | 560.70 | 0.40 | 88.89 | 155.56 | 0.08 | 0 | 0.01 |
| 17A | 48.18 | 18.17 | 2.65 | 87.36 | 1.70 | 28.57 | 40.00 | 0.10 | 0 | 0.25 |
| 17B | 47.22 | 14.03 | 3.36 | 88.08 | 1.80 | 25.00 | 35.00 | 0.10 | 0 | 0.3 |
| 18 | 275.24 | 102.67 | 2.68 | 559.47 | 0.60 | 31.25 | 87.50 | 0.05 | 0.02 | 0.09 |
| 19 | 272.12 | 89.15 | 3.05 | 586.97 | 2.30 | 16.22 | 37.84 | 0.06 | 0 | 0.31 |

[1]VYL means Vinyl
[2]VYD means Vinylidene

Example 3

(Comparative)

Catalysts Used

General Preparation of SMAO-948: Silica gel used was DAVISON™ 948, (W. R. Grace & Co., Houston, Tex.) calcined at 600° C. under a stream of nitrogen. To a slurry of silica gel (50 g) in toluene (100 ml) was slowly added methyl alumoxane (MAO, 58 g, 30 wt % in toluene, Albemarle, Baton Rouge, La.) with stirring. The MAO used was not stripped of TMA. The reaction mixture was heated to 90° C. for 2 hours, cooled, filtered and dried in vacuo to yield a free-flowing solid.

Catalyst C-9

SMAO-948 (10 g) was slurried in toluene (30 mls) at ambient temperature and reacted with [Me₂Si(Flu)(CpMe₄)]ZrCl₂ (0.19 g) for 12 hrs. The solid catalyst was filtered, washed with hexane (40 ml) and dried in vacuo to yield a free-flowing pink solid.

The metallocene compound is represented by the following structure:

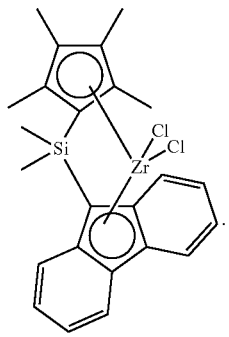

Catalyst C-10

SMAO-948 (5.0 g) was slurried in toluene (30 mls) at ambient temperature and reacted with [Me₂Si(3-n-propyl-CpMe₃)(Flu)]ZrCl₂ (0.108 g) for 2 hrs. The solid catalyst was filtered, washed with hexane (40 ml) and dried in vacuo to yield a free-flowing red-orange solid.

The metallocene compound is represented by the following structure:

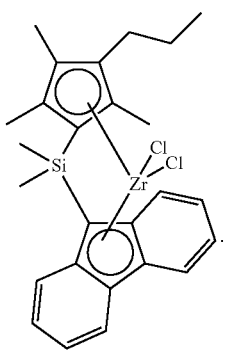

General Polymerization

Into a 1 L stainless steel autoclave reactor was charged 400 mL of hexane. Then 20 mL 1-hexene was added to the reactor. TIBAL (0.5 mL) was added as solution in 2 mL of toluene. Ethylene was added (125 psi) and the reactor was heated to 85° C. with stirring rate set at 1280 rpm. The supported catalyst system (18.9 mg) was then added by a short nitrogen purge, followed by a 100 mL hexane wash, through a small stainless steel bomb attached securely to the reactor. Ethylene was maintained at the initial pressure throughout the polymerization. The polymerization was allowed to proceed for thirty minutes at which time the reactor was cooled and excess pressure vented into the hood. The solid resin was transferred into a glass vessel and dried at 80° C. in a vacuum oven for at least 2 hours. The yields and resin characterization are also presented in Table 3.

TABLE 3

REACTOR CONDITIONS AND POLYMER ANALYSIS FOR COMPARATIVE EXAMPLES

| | Run # | |
|---|---|---|
| | 1 | 2 |
| Catalyst | C-9 | C-10 |
| Amount of catalyst (mg) | 18.9 | 36.3 |
| Hexene (mL) | 20 | 20 |

TABLE 3-continued

REACTOR CONDITIONS AND POLYMER ANALYSIS FOR COMPARATIVE EXAMPLES

| | Run # | |
|---|---|---|
| | 1 | 2 |
| Ethylene (psig) | 125 | 125 |
| Ethylene (MPa) | 0.86 | 0.86 |
| Temperature (° C.) | 85 | 85 |
| Time (mins) | 30 | 30 |
| Yield (g) | 5.5 | 4.8 |
| Polymer Analysis | | |
| Vinylene ($^1$H NMR), mols | 0.01 | 0.01 |
| Vinyl ($^1$H NMR), mols | 0.17 | 0.14 |
| Vinylidene ($^1$H NMR), mols | 0.02 | 0.01 |
| % Vinyls | 85 | 87 |
| Mn ($^1$H NMR) (g/mol) | 70,000 | 88,000 |

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, "comprising" encompasses the terms "consisting essentially of," "is," and "consisting of" and anyplace "comprising" is used "consisting essentially of," "is," or "consisting of" may be substituted therefor.

We claim:

1. A process to produce polyethylene comprising:
   (a) contacting ethylene with a supported metallocene catalyst system;
   wherein the supported catalyst system comprises:
   (i) a support material;
   (ii) an alumoxane activator having from about 1 wt % to about 14 wt % trimethylaluminum, based on the weight of the alumoxane activator;
   (iii) a metallocene compound represented by the formula:

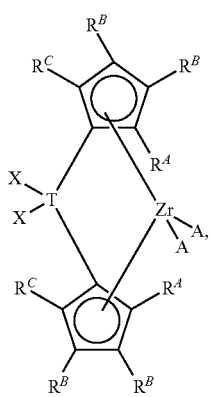

wherein
T is Si or Ge;
each $R^A$ is a $C_1$ to $C_{20}$ substituted or unsubstituted hydrocarbyl group;
each $R^B$ is, independently, H or a $C_1$ to $C_8$ substituted or unsubstituted hydrocarbyl group, or a group represented by the formula —$CH_2R^x$;
wherein $R^x$ is a $C_1$ to $C_{20}$ substituted or unsubstituted hydrocarbyl group provided that at least one $R^B$ is methyl or a group represented by the formula —$CH_2R^x$;
each $R^C$ is, independently, H or a $C_1$ to $C_{20}$ substituted or unsubstituted hydrocarbyl group;
each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers, and two A groups can form a cyclic structure including aromatic, partially saturated, or saturated cyclic or fused ring system;
each X is, independently, hydrogen, halogen or a substituted or unsubstituted $C_1$ to $C_{20}$ hydrocarbyl, and two X groups can form a cyclic structure including aromatic, partially saturated, or saturated cyclic or fused ring system;
further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated;
(b) obtaining a vinyl terminated polyethylene having:
(i) at least 60% allyl chain ends, based on total unsaturations;
(ii) a molecular weight distribution of less than or equal to 4.0;
(iii) an Mn ($^1$HNMR) of at least 20,000 g/mol; and
(iv) wherein the polyethylene is an ethylene polymer having less than 2wt % of a $C_3$ to $C_{40}$ alphaolefin comonomer.

2. The process of claim 1, wherein the vinyl terminated polyethylene has at least 95% allyl chain ends, based on total unsaturations.

3. The process of claim 1, wherein the vinyl terminated polyethylene has a molecular weight distribution of less than or equal to 3.5.

4. The process of claim 1, wherein the vinyl terminated polyethylene comprises 0 wt % of a $C_3$ to $C_{40}$ alphaolefin comonomer.

5. The process of claim 1, wherein the vinyl terminated polyethylene having 2 to about 20 wt % of a $C_3$ to $C_{40}$ alphaolefin comonomer.

6. The process of claim 5, wherein the vinyl terminated polyethylene has at least 75 wt % allyl chain ends, based on total unsaturations.

7. The process of claim 1, wherein the vinyl terminated polyethylene has an Mn (GPC)/Mn ($^1$HNMR) in the range of from about 0.8 to about 1.2.

8. The process of claim 1, wherein the vinyl terminated polyethylene has an Mn (GPC)/Mn ($^1$HNMR) in the range of from about 0.9 to about 1.1.

9. The process of claim 1, wherein 0 wt % of hydrogen is used in the polymerization.

10. The process of claim 1, wherein the group represented by the formula —$CH_2R^x$ is selected from the group consisting of ethyl, n-propyl, n-butyl, sec-butyl, and benzyl groups.

11. The process of claim 1, wherein $R^A$ is methyl.

12. The process of claim 1, wherein $R^B$ and/or $R^A$ or $R^C$ fuse to form a substituted or unsubstituted indene or a fluorene.

13. The process of claim 1, wherein the catalyst is represented by the following structure:

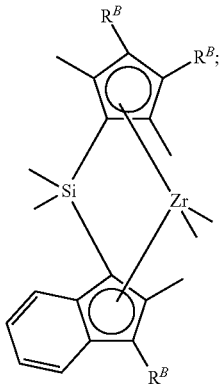

wherein each $R^B$ is, independently, H or a $C_1$ to $C_8$ substituted or unsubstituted hydrocarbyl group, or a group represented by the formula —$CH_2R^x$;

wherein $R^x$ is a $C_1$ to $C_{20}$ substituted or unsubstituted hydrocarbyl group, provided that at least one $R^B$ is methyl or a group represented by the formula —$CH_2R^x$.

14. The process of claim 1, wherein the metallocene compound is represented by the following structure:

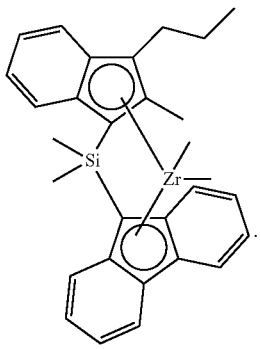

15. The process of claim 1, wherein the metallocene compound is one or more of: $Me_2Si(3\text{-}n\text{-propylCpMe}_3)(C_{13}H_8)ZrCl_2$; $Me_2Si(3\text{-}n\text{-propylCpMe}_3)(C_{13}H_8)ZrMe_2$; $Me_2Si(3\text{-}n\text{-butylCpMe}_3)(C_{13}H_8)ZrCl_2$; $Me_2Si(3\text{-}n\text{-butylCpMe}_3)(C_{13}H_8)ZrMe_2$; $Me_2Si(3\text{-benzylCpMe}_3)(C_{13}H_8)ZrCl_2$; $Me_2Si(3\text{-benzylCpMe}_3)(C_{13}H_8)ZrMe_2$; $Me_2Si(3\text{-}CH_2\text{-cyclopropylCpMe}_3)(C_{13}H_8)ZrCl_2$; $Me_2Si(3\text{-}CH_2\text{-cyclopropylCpMe}_3)(C_{13}H_8)ZrMe_2$; $Me_2Ge(3\text{-}n\text{-propylCpMe}_3)(C_{13}H_8)ZrCl_2$; $Me_2Ge(3\text{-}n\text{-propylCpMe}_3)(C_{13}H_8)ZrMe_2$; $Et_2Si(3\text{-}n\text{-propylCpMe}_3)(C_{13}H_8)ZrCl_2$; $Et_2Si(3\text{-}n\text{-propylCpMe}_3)(C_{13}H_8)ZrMe_2$; $(Hexyl)_2Si(3\text{-}n\text{-propylCpMe}_3)(C_{13}H_8)ZrCl_2$; $(Hexyl)_2Si(3\text{-}n\text{-propylCpMe}_3)(C_{13}H_8)ZrMe_2$; $[(C_3H_6)Si](3\text{-}n\text{-propylCpMe}_3)(C_{13}H_8)ZrCl_2$; $[(C_3H_6)Si](3\text{-}n\text{-propylCpMe}_3)(C_{13}H_8)ZrMe_2$; $[(C_4H_8)Si](3\text{-}n\text{-propylCpMe}_3)(C_{13}H_8)ZrCl_2$; $[(C_4H_8)Si](3\text{-}n\text{-propylCpMe}_3)(C_{13}H_8)ZrMe_2$; $Me_2Si(CpMe_4)(C_{13}H_8)ZrCl_2$; $Me_2Si(CpMe_4)(C_{13}H_8)ZrMe_2$; $Me_2Ge(CpMe_4)(C_{13}H_8)ZrCl_2$; $Me_2Ge(CpMe_4)(C_{13}H_8)ZrMe_2$; $Et_2Si(CpMe_4)(C_{13}H_8)ZrCl_2$; $Et_2Si(CpMe_4)(C_{13}H_8)ZrMe_2$; $(Hexyl)_2Si(CpMe_4)(C_{13}H_8)ZrCl_2$; $(Hexyl)_2Si(CpMe_4)(C_{13}H_8)ZrMe_2$; $[(C_3H_6)Si](CpMe_4)(C_{13}H_8)ZrCl_2$; $[(C_3H_6)Si](CpMe_4)(C_{13}H_8)ZrMe_2$; $[(C_4H_8)Si](CpMe_4)(C_{13}H_8)ZrCl_2$; $[(C_4H_8)Si](CpMe_4)(C_{13}H_8)ZrMe_2$; $Me_2Si(3\text{-}n\text{-propylCpMe}_3)(2,3\text{-}Me_2C_9H_4)ZrCl_2$; $Me_2Si(3\text{-}n\text{-butylCpMe}_3)(2,3\text{-}Me_2C_9H_4)ZrCl_2$; $Me_2Si(3\text{-benzylCpMe}_3)(2,3\text{-}Me_2C_9H_4)ZrCl_2$; $Me_2Si(3\text{-}CH_2\text{-cyclopropylCpMe}_3)(2,3\text{-}Me_2C_9H_4)ZrCl_2$; $Me_2Ge(3\text{-}n\text{-propylCpMe}_3)(2,3\text{-}Me_2C_9H_4)ZrCl_2$; $Et_2Si(3\text{-}n\text{-propylCpMe}_3)(2,3\text{-}Me_2C_9H_4)ZrCl_2$; $(Hexyl)_2Si(3\text{-}n\text{-propylCpMe}_3)(2,3\text{-}Me_2C_9H_4)ZrCl_2$; $[(C_3H_6)Si](3\text{-}n\text{-propylCpMe}_3)(2,3\text{-}Me_2C_9H_4)ZrCl_2$; $[(C_4H_8)Si](3\text{-}n\text{-propylCpMe}_3)(2,3\text{-}Me_2C_9H_4)ZrCl_2$; $Me_2Si(CpMe_4)(2\text{-methyl,3-}n\text{-propylC}_9H_4)ZrCl_2$; $Me_2Si(CpMe_4)(2\text{-methyl,3-}n\text{-butylC}_9H_4)ZrCl_2$; $Me_2Si(CpMe_4)(2\text{-methyl,3-benzylC}_9H_4)ZrCl_2$; $Me_2Si(CpMe_4)(2\text{-methyl,3-sec-butylC}_9H_4)ZrCl_2$; $Me_2Si(CpMe_4)(2\text{-methyl,3-}CH_2\text{-cyclopropylC}_9H_4)ZrCl_2$; $Me_2Ge(CpMe_4)(2\text{-methyl,3-}n\text{-propylC}_9H_4)ZrCl_2$; $Me_2Ge(CpMe_4)(2\text{-methyl,3-}n\text{-butylC}_9H_4)ZrCl_2$; $Me_2Ge(CpMe_4)(2\text{-methyl,3-benzylC}_9H_4)ZrCl_2$; $Me_2Ge(CpMe_4)(2\text{-methyl,3-sec-butylC}_9H_4)ZrCl_2$; $Me_2Ge(CpMe_4)(2\text{-methyl,3-}CH_2\text{-cyclopropylC}_9H_4)ZrCl_2$; $Et_2Si(CpMe_4)(2\text{-methyl,3-}n\text{-propylC}_9H_4)ZrCl_2$; $Et_2Si(CpMe_4)(2\text{-methyl,3-}n\text{-butylC}_9H_4)ZrCl_2$; $Et_2Si(CpMe_4)(2\text{-methyl,3-benzylC}_9H_4)ZrCl_2$; $Et_2Si(CpMe_4)(2\text{-methyl,3-sec-butylC}_9H_4)ZrCl_2$; $Et_2Si(CpMe_4)(2\text{-methyl,3-}CH_2\text{-cyclopropylC}_9H_4)ZrCl_2$; $(Hexyl)_2Si(CpMe_4)(2\text{-methyl,3-}n\text{-propylC}_9H_4)ZrCl_2$; $(Hexyl)_2Si(CpMe_4)(2\text{-methyl,3-}n\text{-butylC}_9H_4)ZrCl_2$; $(Hexyl)_2Si(CpMe_4)(2\text{-methyl,3-benzylC}_9H_4)ZrCl_2$; $(Hexyl)_2Si(CpMe_4)(2\text{-methyl,3-sec-butylC}_9H_4)ZrCl_2$; $(Hexyl)_2Si(CpMe_4)(2\text{-methyl,3-}CH_2\text{-cyclopropylC}_9H_4)ZrCl_2$; $[(C_3H_6)Si](CpMe_4)(2\text{-methyl,3-}n\text{-propylC}_9H_4)ZrCl_2$; $[(C_3H_6)Si](CpMe_4)(2\text{-methyl,3-}n\text{-butylC}_9H_4)ZrCl_2$; $[(C_3H_6)Si](CpMe_4)(2\text{-methyl,3-benzylC}_9H_4)ZrCl_2$; $[(C_3H_6)Si](CpMe_4)(2\text{-methyl,3-sec-butylC}_9H_4)ZrCl_2$; $[(C_3H_6)Si](CpMe_4)(2\text{-methyl,3-}CH_2\text{-cyclopropylC}_9H_4)ZrCl_2$; $[(C_4H_8)Si](CpMe_4)(2\text{-methyl,3-}n\text{-propylC}_9H_4)ZrCl_2$; $[(C_4H_8)Si](CpMe_4)(2\text{-methyl,3-}n\text{-butylC}_9H_4)ZrCl_2$; $[(C_4H_8)Si](CpMe_4)(2\text{-methyl,3-benzylC}_9H_4)ZrCl_2$; $[(C_4H_8)Si](CpMe_4)(2\text{-methyl,3-sec-butylC}_9H_4)ZrCl_2$; $[(C_4H_8)Si](CpMe_4)(2\text{-methyl,3-}CH_2\text{-cyclopropylC}_9H_4)ZrCl_2$; $Me_2Si(3\text{-}n\text{-propylCpMe}_3)(CpMe_4)ZrCl_2$; $Me_2Si(3\text{-}n\text{-propylCpMe}_3)(CpMe_4)ZrMe_2$; $Me_2Si(3\text{-}n\text{-butylCpMe}_3)(CpMe_4)ZrCl_2$; $Me_2Si(3\text{-}n\text{-butylCpMe}_3)(CpMe_4)ZrMe_2$; $Me_2Si(3\text{-benzylCpMe}_3)(CpMe_4)ZrCl_2$; $Me_2Si(3\text{-benzylCpMe}_3)(CpMe_4)ZrMe_2$; $Me_2Si(3\text{-}CH_2\text{-cyclopropylCpMe}_3)(CpMe_4)ZrCl_2$; $Me_2Si(3\text{-}CH_2\text{-cyclopropylCpMe}_3)(CpMe_4)ZrMe_2$; $Me_2Ge(3\text{-}n\text{-propylCpMe}_3)(CpMe_4)ZrCl_2$; $Me_2Ge(3\text{-}n\text{-propylCpMe}_3)(CpMe_4)ZrMe_2$; $Et_2Si(3\text{-}n\text{-propylCpMe}_3)(CpMe_4)ZrCl_2$; $Et_2Si(3\text{-}n\text{-propylCpMe}_3)(CpMe_4)ZrMe_2$; $(Hexyl)_2Si(3\text{-}n\text{-propylCpMe}_3)(CpMe_4)ZrCl_2$; $(Hexyl)_2Si(3\text{-}n\text{-propylCpMe}_3)(CpMe_4)ZrMe_2$; $[(C_3H_6)Si](3\text{-}n\text{-propylCpMe}_3)(CpMe_4)ZrCl_2$; $[(C_3H_6)Si](3\text{-}n\text{-propylCpMe}_3)(CpMe_4)ZrMe_2$; $[(C_4H_8)Si](3\text{-}n\text{-propylCpMe}_3)(CpMe_4)ZrCl_2$; $[(C_4H_8)Si](3\text{-}n\text{-propylCpMe}_3)(CpMe_4)ZrMe_2$; rac-$Me_2Si(2\text{-Me,3-}n\text{-propylC}_9H_4)(2,3\text{-}Me_2C_9H_4)ZrCl_2$; rac-$Me_2Si(2\text{-Me,3-}n\text{-propylC}_9H_4)_2ZrCl_2$; rac-$Me_2Si(2\text{-Me,3-}n\text{-butylC}_9H_4)(2,3\text{-}Me_2C_9H_4)ZrCl_2$; rac-$Me_2Si(2\text{-Me,3-}n\text{-butylC}_9H_4)_2ZrCl_2$; rac-$Me_2Si(2\text{-Me,3-}CH_2\text{-cyclopropylC}_9H_4)(2,3\text{-}Me_2C_9H_4)ZrCl_2$; rac-$Me_2Si(2\text{-Me,3-}CH_2\text{-cyclopropylC}_9H_4)_2ZrCl_2$; rac-$Me_2Ge(2\text{-Me,3-}n\text{-propylC}_9H_4)(2,3\text{-}Me_2C_9H_4)ZrCl_2$; rac-$Me_2Ge(2\text{-Me,3-}n\text{-propylC}_9H_4)_2ZrCl_2$; rac-$Et_2Si(2\text{-Me,3-}n\text{-propylC}_9H_4)(2,3\text{-}Me_2C_9H_4)ZrCl_2$; $Et_2Si(2\text{-Me,3-}n\text{-propylC}_9H_4)_2ZrCl_2$; rac-$(Hexyl)_2Si(2\text{-Me,3-}n\text{-propylC}_9H_4)(2,3\text{-}Me_2C_9H_4)ZrCl_2$; rac-$(Hexyl)_2Si(2\text{-Me,3-}n\text{-propylC}_9H_4)_2ZrCl_2$; rac-$[(C_3H_6)Si](2\text{-Me,3-}n\text{-propylC}_9H_4)$ (2,3-Me$_2$C$_9$H$_4$)ZrCl$_2$; rac-[(C$_3$H$_6$)Si](2-Me,3-n-propylC$_9$H$_4$)$_2$ZrCl$_2$; rac-[(C$_4$H$_8$)Si](2-Me,3-n-propylC$_9$H$_4$)(2,3-Me$_2$C$_9$H$_4$)ZrCl$_2$; rac-[(C$_4$H$_8$)Si](2-Me,3-n-propylC$_9$H$_4$)$_2$ZrCl$_2$; Me$_2$Si(C$_{13}$H$_8$)(2-methyl,3-n-propylC$_9$H$_4$)ZrCl$_2$; Me$_2$Si(C$_{13}$H$_8$)(2-methyl,3-n-butylC$_9$H$_4$)ZrCl$_2$; Me$_2$Si(C$_{13}$H$_8$)(2-methyl,3-benzylC$_9$H$_4$)ZrCl$_2$; Me$_2$Si(C$_{13}$H$_8$)(2-methyl,3-sec-butylC$_9$H$_4$)ZrCl$_2$; Me$_2$Si(C$_{13}$H$_8$)(2-methyl,3-CH$_2$-cyclopropylC$_9$H$_4$)ZrCl$_2$; Me$_2$Ge(C$_{13}$H$_8$)(2-methyl,3-n-propylC$_9$H$_4$)ZrCl$_2$; Me$_2$Ge(C$_{13}$H$_8$)(2-methyl,3-n-butylC$_9$H$_4$)ZrCl$_2$; Me$_2$Ge(C$_{13}$H$_8$)(2-methyl,3-benzylC$_9$H$_4$)ZrCl$_2$; Me$_2$Ge(C$_{13}$H$_8$)(2-methyl,3-sec-butylC$_9$H$_4$)ZrCl$_2$; Me$_2$Ge(C$_{13}$H$_8$)(2-methyl,3-CH$_2$-cyclopropylC$_9$H$_4$)ZrCl$_2$; Et$_2$Si(C$_{13}$H$_8$)(2-methyl,3-n-propylC$_9$H$_4$)ZrCl$_2$; Et$_2$Si(C$_{13}$H$_8$)(2-methyl,3-n-butylC$_9$H$_4$)ZrCl$_2$; Et$_2$Si(C$_{13}$H$_8$)(2-methyl,3-benzylC$_9$H$_4$)ZrCl$_2$; Et$_2$Si(C$_{13}$H$_8$)(2-methyl,3-sec-butylC$_9$H$_4$)ZrCl$_2$; Et$_2$Si(C$_{13}$H$_8$)(2-methyl,3-CH$_2$-cyclopropylC$_9$H$_4$)ZrCl$_2$; (Hexyl)$_2$Si(C$_{13}$H$_8$)(2-methyl,3-n-propylC$_9$H$_4$)ZrCl$_2$; (Hexyl)$_2$Si(C$_{13}$H$_8$)(2-methyl,3-n-butylC$_9$H$_4$)ZrCl$_2$; (Hexyl)$_2$Si(C$_{13}$H$_8$)(2-methyl,3-benzylC$_9$H$_4$)ZrCl$_2$; (Hexyl)$_2$Si(C$_{13}$H$_8$)(2-methyl,3-sec-butylC$_9$H$_4$)ZrCl$_2$; (Hexyl)$_2$Si(C$_{13}$H$_8$)(2-methyl,3-CH$_2$-cyclopropylC$_9$H$_4$)ZrCl$_2$; [(C$_3$H$_6$)Si](C$_{13}$H$_8$)(2-methyl,3-n-propylC$_9$H$_4$)ZrCl$_2$; [(C$_3$H$_6$)Si](C$_{13}$H$_8$)(2-methyl,3-n-butylC$_9$H$_4$)ZrCl$_2$; [(C$_3$H$_6$)Si](C$_{13}$H$_8$)(2-methyl,3-benzylC$_9$H$_4$)ZrCl$_2$; [(C$_3$H$_6$)Si](C$_{13}$H$_8$)(2-methyl,3-sec-butylC$_9$H$_4$)ZrCl$_2$; [(C$_3$H$_6$)Si](C$_{13}$H$_8$)(2-methyl,3-CH$_2$-cyclopropylC$_9$H$_4$)ZrCl$_2$; [(C$_4$H$_8$)Si](C$_{13}$H$_8$)(2-methyl,3-n-propylC$_9$H$_4$)ZrCl$_2$; [(C$_4$H$_8$)Si](C$_{13}$H$_8$)(2-methyl,3-n-butylC$_9$H$_4$)ZrCl$_2$; [(C$_4$H$_8$)Si](C$_{13}$H$_8$)(2-methyl,3-benzylC$_9$H$_4$)ZrCl$_2$; [(C$_4$H$_8$)Si](C$_{13}$H$_8$)(2-methyl,3-sec-butylC$_9$H$_4$)ZrCl$_2$; [(C$_4$H$_8$)Si](C$_{13}$H$_8$)(2-methyl,3-CH$_2$-cyclopropylC$_9$H$_4$)ZrCl$_2$; and the zirconium dimethyl analogs of the above dichloride metallocene compounds, wherein the Cl groups on the Zr are preplaced with CH$_3$ groups; wherein Me is methyl, Et is ethyl, C$_9$H$_4$ is an indenyl group; C$_{13}$H$_8$ is a fluorenyl group, [(C$_3$H$_6$)Si] is silacyclobutyl bridge, and [(C$_4$H$_8$)Si] is silacyclopentyl bridge.

16. The process of claim 1, wherein the support material is SiO$_2$, Al$_2$O$_3$, or SiO$_2$/Al$_2$O$_3$.

17. The process of claim 1, wherein the alumoxane activator is an alkylalumoxane.

18. The process of claim 1, wherein the alumoxane activator is methylalumoxane.

19. The process of claim 1, wherein the alumoxane activator comprises from about 0.5 to about 13 wt % trimethylaluminum, based on total aluminum.

20. The process of claim 1, wherein the alumoxane activator comprises from about 1.0 to about 12 wt % trimethylaluminum, based on total aluminum.

21. The process of claim 1, wherein the polyethylene has at least 98% allyl chain ends, based on total unsaturations.

22. The process of claim 1, wherein the contacting step (a) takes place at a temperature in the range of about 40° C. to about 150° C.

23. The process of claim 1, wherein the contacting step (a) takes place at a pressure in the range of from about 0.55 MPa to about 2.4 MPa.

24. The process of claim 1, wherein the polyethylene is in the form of free-flowing, discrete particles.

25. The process of claim 1, wherein the polyethylene has a branching index, g'(vis), of greater than 0.90.

26. The process of claim 1, wherein the polyethylene has an Mn ($^1$H NMR) of less than 125,000 g/mol.

* * * * *